US00RE44677E

(19) United States
(12) Reissued Patent
Campau et al.

(10) Patent Number: US RE44,677 E
(45) Date of Reissued Patent: Dec. 31, 2013

(54) ELECTRONIC BRAKE MANAGEMENT SYSTEM WITH MANUAL FAIL SAFE

(75) Inventors: Gregory P. Campau, Plymouth, MI (US); Andrew W. Kingston, Waldesch (DE); Robert L. Ferger, Vaihingen an der Enz (DE); Thomas Weigert, Sulzbach (DE); Salvatore Oliveri, Filsen (DE); Blaise J. Ganzel, Ann Arbor, MI (US); Mark S. Luckevich, Austin, TX (US)

(73) Assignee: Kelsey-Hayes Company, Livonia, MI (US)

(21) Appl. No.: 09/939,509

(22) Filed: Aug. 24, 2001

Related U.S. Patent Documents

Reissue of:

(64) Patent No.: 5,941,608
Issued: Aug. 24, 1999
Appl. No.: 08/813,146
Filed: Mar. 7, 1997

U.S. Applications:

(60) Provisional application No. 60/038,043, filed on Mar. 6, 1997, provisional application No. 60/032,595, filed on Dec. 2, 1996, provisional application No. 60/018,814, filed on May 31, 1996, provisional application No. 60/013,005, filed on Mar. 7, 1996.

(51) Int. Cl.
*B60T 8/34* (2006.01)

(52) U.S. Cl.
USPC ..... 303/113.4; 303/115.4; 303/84.2; 303/DIG. 3

(58) Field of Classification Search
USPC ..... 303/3, 10, 15, 113.4, 113.5, 122.09, 303/122.11, 122.13, 155, 166, 115.1, 116.1, 303/116.2
See application file for complete search history.

(56) References Cited

U.S. PATENT DOCUMENTS 3,802,745 A 4/1974 Strifler et al.
4,143,514 A * 3/1979 Leiber ..... 60/534

(Continued)

FOREIGN PATENT DOCUMENTS

DE 1961039 6/1971
DE 3408872 9/1985

(Continued)

OTHER PUBLICATIONS

Abstract of patent document DE3423944 printed from the EPO internet site http://12.espacenet.com/espacenet/viewer?PN=DE3423944&CY=ep&LG=en&DB=EPD, printed Jul. 25, 2002.

(Continued)

*Primary Examiner* — Christopher Schwartz
(74) *Attorney, Agent, or Firm* — MacMillan, Sobanski & Todd, LLC

(57) ABSTRACT

An improved electro-hydraulic brake system having features for improving the pedal feel of the system, while further having design features which contribute to the economy of manufacture of certain components of the system. The system provides for an electrically powered normal source of pressurized hydraulic brake fluid, and a manually powered backup source of pressurized hydraulic brake fluid to the vehicle brakes in the event of failure of the normal source. During normal braking, fluid from the backup source is redirected from the vehicle brakes to a pedal simulator. The pedal simulator preferably includes arrangements of spring loaded pistons, expansion volumes, and damping orifices, together with valves selectively controlling the flow of fluid to and from the pedal simulator which provides for an improved pedal feel during vehicle braking. The brake system of the invention further includes a relatively low cost fluid separator unit which is provided which prevents intermixing of pressurized fluid between the backup source and the normal source. The fluid separator unit acts to permit the normal source to act upon the hydraulic brake fluid of the backup source to operate the vehicle brakes. The fluid separator unit is preferably embodied as a piston having two working faces, each of the same diameter.

36 Claims, 7 Drawing Sheets

(56) References Cited

U.S. PATENT DOCUMENTS

| | | | | |
|---|---|---|---|---|
| 4,462,642 | A | | 7/1984 | Leiber |
| 4,580,847 | A | | 4/1986 | Burgdorf |
| 4,640,555 | A | | 2/1987 | Bertling et al. |
| 4,656,833 | A | | 4/1987 | Belart |
| 4,723,412 | A | | 2/1988 | Buschmann |
| 4,812,777 | A | | 3/1989 | Shirai |
| 4,824,188 | A | | 4/1989 | Hatch |
| 4,832,416 | A | | 5/1989 | Kaes et al. |
| 4,834,465 | A | | 5/1989 | Guichard et al. |
| 4,880,282 | A | | 11/1989 | Makino et al. |
| 4,914,917 | A | | 4/1990 | Schonlau |
| 4,950,038 | A | | 8/1990 | Ocvirk et al. |
| 5,123,713 | A | | 6/1992 | Steiner |
| 5,195,810 | A | | 3/1993 | Ocvirk et al. |
| 5,197,787 | A | | 3/1993 | Matsuda et al. |
| 5,230,549 | A | * | 7/1993 | Osada et al. ..... 303/3 |
| 5,261,730 | A | | 11/1993 | Steiner et al. |
| 5,273,348 | A | | 12/1993 | Yagi et al. |
| 5,282,676 | A | | 2/1994 | Takeda et al. |
| 5,288,139 | A | | 2/1994 | Singleton et al. |
| 5,302,008 | A | | 4/1994 | Miyake et al. |
| 5,312,172 | A | | 5/1994 | Takeuchi |
| 5,320,421 | A | | 6/1994 | Kade et al. |
| 5,360,322 | A | | 11/1994 | Henein et al. |
| 5,378,052 | A | | 1/1995 | Yoshino |
| 5,429,425 | A | | 7/1995 | Drott |
| 5,447,363 | A | | 9/1995 | Fukamachi |
| 5,460,436 | A | | 10/1995 | Volz et al. |
| 5,475,596 | A | | 12/1995 | Henry et al. |
| 5,484,194 | A | | 1/1996 | Reinartz et al. |
| 5,496,099 | A | * | 3/1996 | Resch ..... 303/114.1 |
| 5,531,509 | A | | 7/1996 | Kellner et al. |
| 5,544,948 | A | | 8/1996 | Schmidt et al. |
| 5,547,264 | A | | 8/1996 | Tozu et al. |
| 5,558,409 | A | | 9/1996 | Walenty et al. |
| 5,564,797 | A | * | 10/1996 | Steiner et al. ..... 303/113.4 |
| 5,567,021 | A | | 10/1996 | Gaillard |
| 5,588,718 | A | * | 12/1996 | Winner et al. ..... 303/113.1 |
| 5,609,401 | A | | 3/1997 | Johnston et al. |
| 5,611,606 | A | * | 3/1997 | Nell et al. ..... 303/155 |
| 5,613,740 | A | | 3/1997 | Kawamoto et al. |
| 5,700,072 | A | | 12/1997 | Cook et al. |
| 5,720,534 | A | | 2/1998 | Stumpe |
| 5,722,744 | A | | 3/1998 | Kupfer et al. |
| 5,727,852 | A | | 3/1998 | Pueschel et al. |
| 5,743,600 | A | | 4/1998 | Yasuda et al. |
| 5,752,748 | A | | 5/1998 | Schramm et al. |
| 5,788,341 | A | | 8/1998 | Penrod et al. |
| 5,816,666 | A | | 10/1998 | Wiss |
| 5,823,640 | A | | 10/1998 | Eichhorn et al. |
| 5,908,983 | A | | 6/1999 | Binder |
| 5,918,948 | A | | 7/1999 | Burgdorf et al. |
| 5,934,767 | A | | 8/1999 | Schmidt et al. |
| 5,941,608 | A | | 8/1999 | Campau et al. |
| 5,941,924 | A | | 8/1999 | Maisch |
| 5,952,799 | A | | 9/1999 | Maisch et al. |
| 5,954,407 | A | | 9/1999 | Schramm et al. |
| 5,979,999 | A | | 11/1999 | Poertzgen et al. |
| 5,988,768 | A | | 11/1999 | Schaefer et al. |
| 6,003,961 | A | | 12/1999 | Binder et al. |
| 6,007,161 | A | | 12/1999 | Wörsdörfer |
| 6,019,441 | A | | 2/2000 | Lloyd et al. |
| 6,030,055 | A | | 2/2000 | Schubert |
| 6,033,035 | A | | 3/2000 | Neumann et al. |
| 6,033,036 | A | | 3/2000 | Ruffer et al. |
| 6,058,705 | A | | 5/2000 | Schunck |
| 6,074,019 | A | | 6/2000 | Phillips et al. |
| 6,076,897 | A | | 6/2000 | Binder et al. |
| 6,082,830 | A | | 7/2000 | Volz et al. |
| 6,086,167 | A | | 7/2000 | Heckmann et al. |
| 6,099,086 | A | | 8/2000 | Feigel et al. |
| 6,135,575 | A | | 10/2000 | Feigel et al. |
| 6,149,247 | A | | 11/2000 | Hofmann et al. |
| 6,158,825 | A | | 12/2000 | Schunck et al. |
| 6,161,904 | A | | 12/2000 | Schmidt et al. |
| 6,164,336 | A | | 12/2000 | Pasquet et al. |
| 6,186,602 | B1 | | 2/2001 | Jonner et al. |
| 6,192,685 | B1 | | 2/2001 | Bourlon et al. |
| 6,206,484 | B1 | | 3/2001 | Ganzel |
| 6,206,488 | B1 | | 3/2001 | Binder et al. |
| 6,206,489 | B1 | | 3/2001 | Schmidt et al. |
| 6,226,586 | B1 | | 5/2001 | Luckevich |

FOREIGN PATENT DOCUMENTS

| | | | |
|---|---|---|---|
| DE | 3423944 | | 1/1986 |
| DE | 4003579 | | 6/1991 |
| DE | 41 02 496 | A1 | 2/1992 |
| DE | 4029793 | | 3/1992 |
| DE | 4037662 | | 6/1992 |
| DE | 4112137 | | 10/1992 |
| DE | 4128087 | | 2/1993 |
| DE | 4201732 | | 7/1993 |
| DE | 4231784 | | 3/1994 |
| DE | 4311673 | | 10/1994 |
| DE | 4319509 | | 12/1994 |
| DE | 4322182 | | 1/1995 |
| DE | 4324041 | | 1/1995 |
| DE | 4413579 | | 10/1995 |
| DE | 4417667 | | 11/1995 |
| DE | 19515842 | A1 | 10/1996 |
| DE | 19538794 | | 4/1997 |
| DE | 19548207 | | 6/1997 |
| DE | 19548248 | | 6/1997 |
| DE | 19604126 | | 8/1997 |
| DE | 19615449 | | 10/1997 |
| DE | 19626926 | | 1/1998 |
| DE | 19632035 | | 2/1998 |
| DE | 19636432 | | 3/1998 |
| DE | 19640781 | | 4/1998 |
| DE | 19701659 | | 7/1998 |
| DE | 19812793 | | 10/1998 |
| DE | 19718533 | | 11/1998 |
| DE | 19725298 | | 12/1998 |
| DE | 19734986 | | 2/1999 |
| DE | 19807368 | | 8/1999 |
| DE | 19821793 | | 11/1999 |
| DE | 19825464 | | 12/1999 |
| DE | 19826132 | | 12/1999 |
| DE | 19826687 | | 12/1999 |
| DE | 19915752 | | 1/2000 |
| DE | 19828552 | | 2/2000 |
| DE | 19828553 | | 2/2000 |
| DE | 19836689 | | 2/2000 |
| DE | 19836690 | | 2/2000 |
| DE | 19836692 | | 2/2000 |
| DE | 19831541 | | 3/2000 |
| DE | 19838948 | | 3/2000 |
| DE | 19850910 | | 5/2000 |
| DE | 19861144 | | 5/2000 |
| DE | 19905660 | | 5/2000 |
| DE | 19920850 | | 5/2000 |
| DE | 19933517 | | 5/2000 |
| DE | 19940252 | | 6/2000 |
| DE | 19914403 | | 10/2000 |
| DE | 19917941 | | 10/2000 |
| DE | 19917904 | | 11/2000 |
| EP | 0348270 | | 12/1989 |
| EP | 0883537 | | 12/1998 |
| FR | 2655933 | | 6/1991 |
| GB | 2327105 | | 1/1999 |
| GB | 2340194 | | 2/2000 |
| JP | 5-77710 | | 3/1993 |
| WO | WO 93/00236 | | 1/1993 |
| WO | WO 93/08055 | | 4/1993 |
| WO | WO 96/11129 | | 4/1996 |
| WO | WO96/39318 | A1 | 12/1996 |
| WO | WO 97/32766 | | 9/1997 |

OTHER PUBLICATIONS

Abstract of patent document DE4037662 printed from the EPO internet site http://12.espacenet.com/espacenet/viewer?PN=DE4037662&CY=ep&LG=en&DB=EPD, printed Jul. 25, 2002.

(56) References Cited

OTHER PUBLICATIONS

Office Action in German pat. app. 197 81 643.6, publication date Feb. 7, 2008, Kelsey-Hayes Co.
German Office Action dated Feb. 25, 2010 in German Case No. 197 58 950.2-21 filed by Kelsey-Hayes Co.
"Electrohydraulic Brake System—The First Approach to Brake-By-Wire Technology" by Jonner et al., SAE Technical Paper Series #960991, copyright 1996 Society of Automotive Engineers, Inc.
"Intelligent Braking for Current and Future Vehicles" by Schenk et al., SAE Technical Paper Series #950762, copyright 1995 Society of Automotive Engineers, Inc.

* cited by examiner

AMENDED
FIG. 10
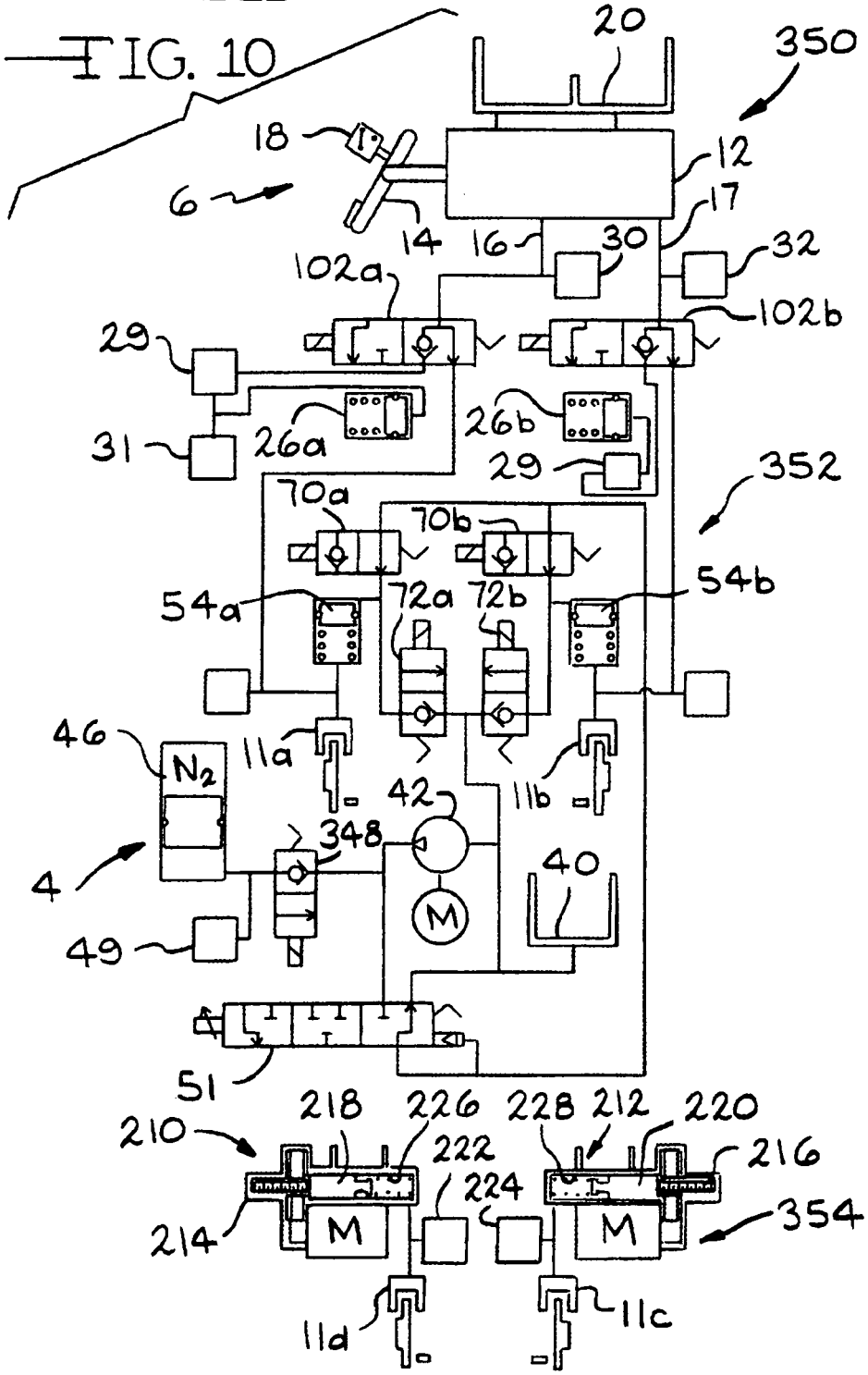

ELECTRONIC BRAKE MANAGEMENT SYSTEM WITH MANUAL FAIL SAFE

Matter enclosed in heavy brackets [ ] appears in the original patent but forms no part of this reissue specification; matter printed in italics indicates the additions made by reissue.

CROSS REFERENCE TO RELATED APPLICATIONS

This application claims the benefit of U.S. Provisional Application No. 60/038,043 filed Mar. 6, 1997, U.S. Provisional Application No. 60/032,595 filed Dec. 2, 1996, U.S. Provisional Application No. 60/018,814 filed May 31, 1996, and U.S. Provisional Application No. 60/013,005 filed Mar. 7, 1996, the disclosures of which are hereby incorporated by reference.

BACKGROUND OF THE INVENTION

This invention relates in general to brake systems for ground vehicles, and in particular to electro-hydraulic brake systems with normal braking pressure supplied by an electrically driven pump.

Electro-hydraulic braking systems with manually powered backup systems have been shown in some publications. For example, German Patent Application DE 4413579A1 illustrates a system having a manually powered master cylinder connected through isolation valves to brakes at a vehicle's wheels. When the isolation valves are shut, pressurized brake fluid from the master cylinder is delivered to a pedal simulator. Pressure transducers are used to develop a signal representative of a desired braking effort, which is fed to an electronic control unit. The electronic control unit controls the operation of motor operated braking pressure generators (pumps) to correspondingly deliver pressurized hydraulic brake fluid to the vehicle brakes.

SUMMARY OF THE INVENTION

While certain general principles of electro-hydraulic braking are known, the known equipment has been relatively expensive, and has had relatively poor functionality in such important areas as "pedal feel", the tactile feedback a driver feels when operating the brake pedal of such a brake system.

This invention relates to an improved electro-hydraulic brake system having features for improving the pedal feel of the system, while further having design features which contribute to an economy of manufacture of certain components of the system. The system provides for an electrically powered normal source of pressurized hydraulic brake fluid, and a manually powered backup source of pressurized hydraulic brake fluid to the vehicle brakes in the event of failure of the normal source. During normal braking, fluid from the backup source is redirected from the vehicle brakes to a pedal simulator. The pedal simulator preferably includes arrangements of spring loaded pistons, expansion volumes, and damping orifices, together with valves selectively controlling the flow of fluid to and from the pedal simulator which provide for an improved pedal feel during vehicle braking. The brake system of the invention further includes a relatively low cost fluid separator unit which is provided to prevent intermixing of pressurized fluid between the backup source and the normal source. The fluid separator unit acts to permit the normal source to act upon the hydraulic brake fluid of the backup source to operate the vehicle brakes. The fluid separator unit is preferably embodied as a piston having two working faces, each of the same diameter.

Various objects and advantages of this invention will become apparent to those skilled in the art from the following detailed description of the preferred embodiment, when read in light of the accompanying drawings.

BRIEF DESCRIPTION OF THE DRAWINGS

FIG. 10 is a schematic view of a vehicle brake system having an electro-hydraulic normal source and a backup source of pressurized hydraulic brake fluid for the front brakes and individual power cylinder for supplying pressurized hydraulic brake fluid to a respective rear wheel.

DETAILED DESCRIPTION OF THE PREFERRED EMBODIMENTS

Figure 1:
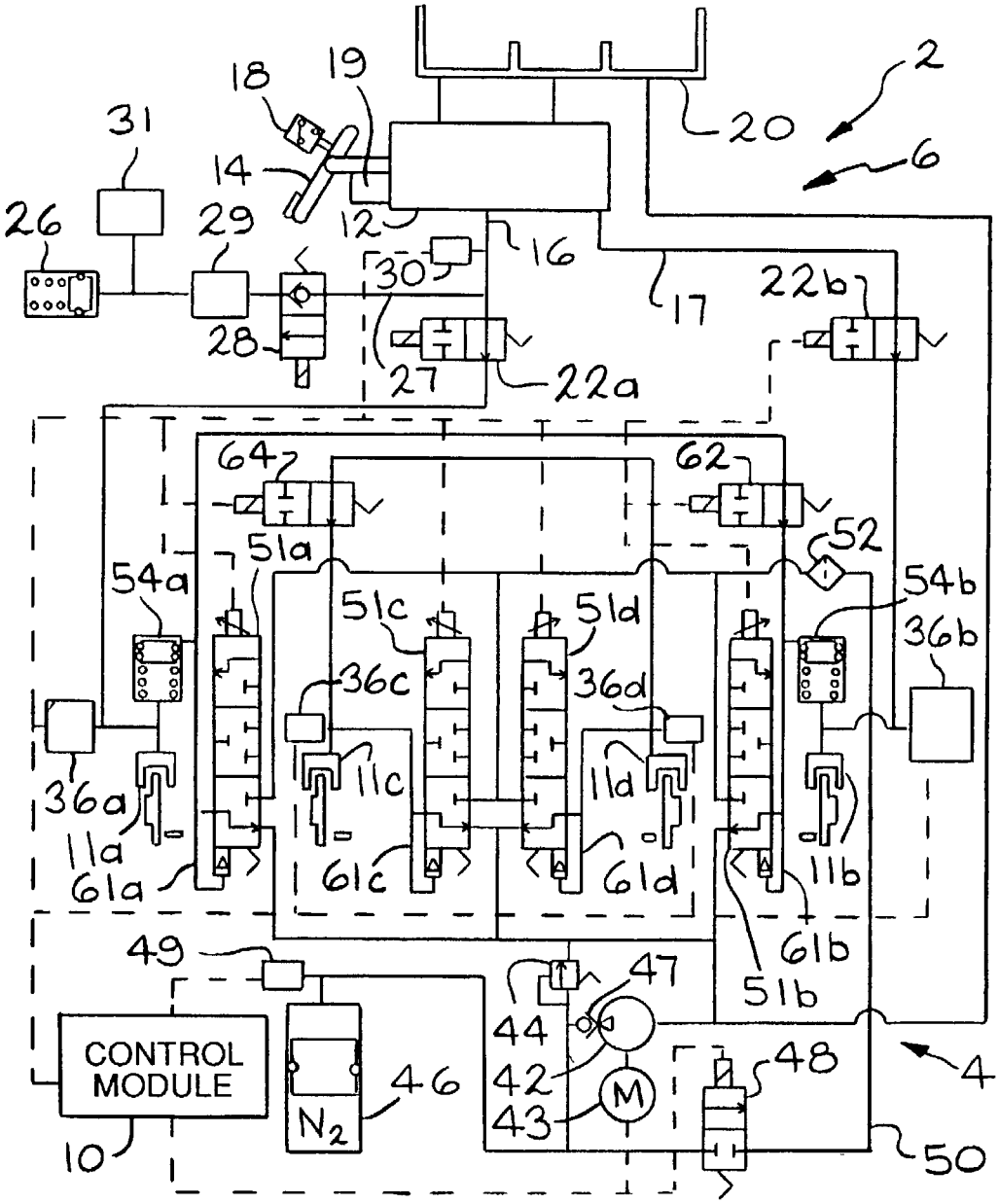
FIG. 1 is a schematic view of a first embodiment of a vehicle brake system.

There is shown in FIG. 1, a first embodiment of a vehicle brake system, indicated generally at 2, in accordance with the invention. The brake system 2 may suitably be used on a ground vehicle such as an automotive vehicle having four wheels and a brake for each wheel. The brake system 2 includes a normal source of pressurized hydraulic brake fluid, indicated at 4, and a backup source of pressurized hydraulic brake fluid, indicated at 6. The normal source 4 includes an electronic control module 10. The control module 10, as will be discussed below, receives various signals, processes these signals, and controls the operation of various components of the brake system 2 based on these signals. In this manner, the control module 10 causes the normal source 4 to cooperate with a portion of the hydraulic circuitry of the backup source 6 to provide hydraulic brake fluid at electronically controlled pressures to four vehicle brakes 11a, b, c, and d. The vehicle brakes 11a, b, c, and d each include a respective brake actuation member (such as a slave cylinder) and friction member actuatable by the actuation member for engaging a rotatable braking surface of the vehicle wheel.

The backup source 6 provides for manual backup braking for, preferably, two of the vehicle brakes 11a and 11b, as will be discussed in detail below. Generally, since the forward or front brakes of a vehicle provide most of the braking resistance in an automotive vehicle in the majority of braking situations, it is envisioned that the front brakes will be connected to the backup supply of pressurized hydraulic brake fluid. However, this invention could be easily adapted to function with any combination of brakes, and is not limited to the configuration shown.

The source of pressurized hydraulic brake fluid for the backup source 6 is a manually operated master cylinder 12. The master cylinder 12 is operated by a brake pedal 14 to supply pressurized hydraulic brake fluid to a first manual backup brake circuit via a conduit 16 and a second manual backup brake circuit via a conduit 17. As shown, the master cylinder 12 is preferably a tandem master cylinder, having two service pistons, but the master cylinder 12 may be of any suitable design, such as a single piston or triple piston design. The brake pedal 14 may be provided with a brake pedal detector 18 to detect the movement of the brake pedal 14. The brake pedal detector 18 may be a switch which actuates the brake lights (not shown), or acts as an input to a control module 10 to indicate that the brake pedal 14 is depressed. The brake pedal 14 is also preferably coupled to a displacement transducer 19 producing a signal indicative of how far the brake pedal 14 is depressed, which is indicative of brake demand by the operator, which signal can be an input to the control module 10. As is common, a reservoir 20 is provided which communicates with the first and second brake circuits through the master cylinder 12 in the ordinary manner. The reservoir 20 may be a single, dual or triple chamber design, as appropriate, and indeed may have any suitable number of chambers.

The conduit 16 is connected via a first electrically operated isolation valve 22a with a first hydraulically operated vehicle brake 11a. The conduit 17 is connected via a second electrically operated isolation valve 22b with a second hydraulically operated vehicle brake 11b. When an isolation valve 22a or 22b is electrically de-energized, the valve is open, as shown in FIG. 1, allowing pressurized brake fluid from the master cylinder 12 to be applied to the associated vehicle brake 11a or 11b to brake the vehicle. In normal operation, the isolation valves 22a and 22b are deenergized open when no braking is occurring. The isolation valves 22a and 22b are energized shut during vehicle braking, isolating the master cylinder 12 from the vehicle brakes 11a and 11b. In this condition, the pressurized brake fluid developed in the master cylinder 12 is routed instead to a pedal simulator 26 via a conduit 27. Located in the conduit 27 is a simulator valve 28 for selectively allowing the passage of fluid flowing into and out of the pedal simulator 26. When the isolation valves 22a and 22b are energized shut, the simulator valve 28 is energized open. When the isolation valves 22a and 22b are deenergized open, the simulator valve 28 is deenergized shut. The isolation valves 22a and 22b and the simulator valve 28 may be pulse width modulated to electronically command the operation of the valves.

Figure 6:
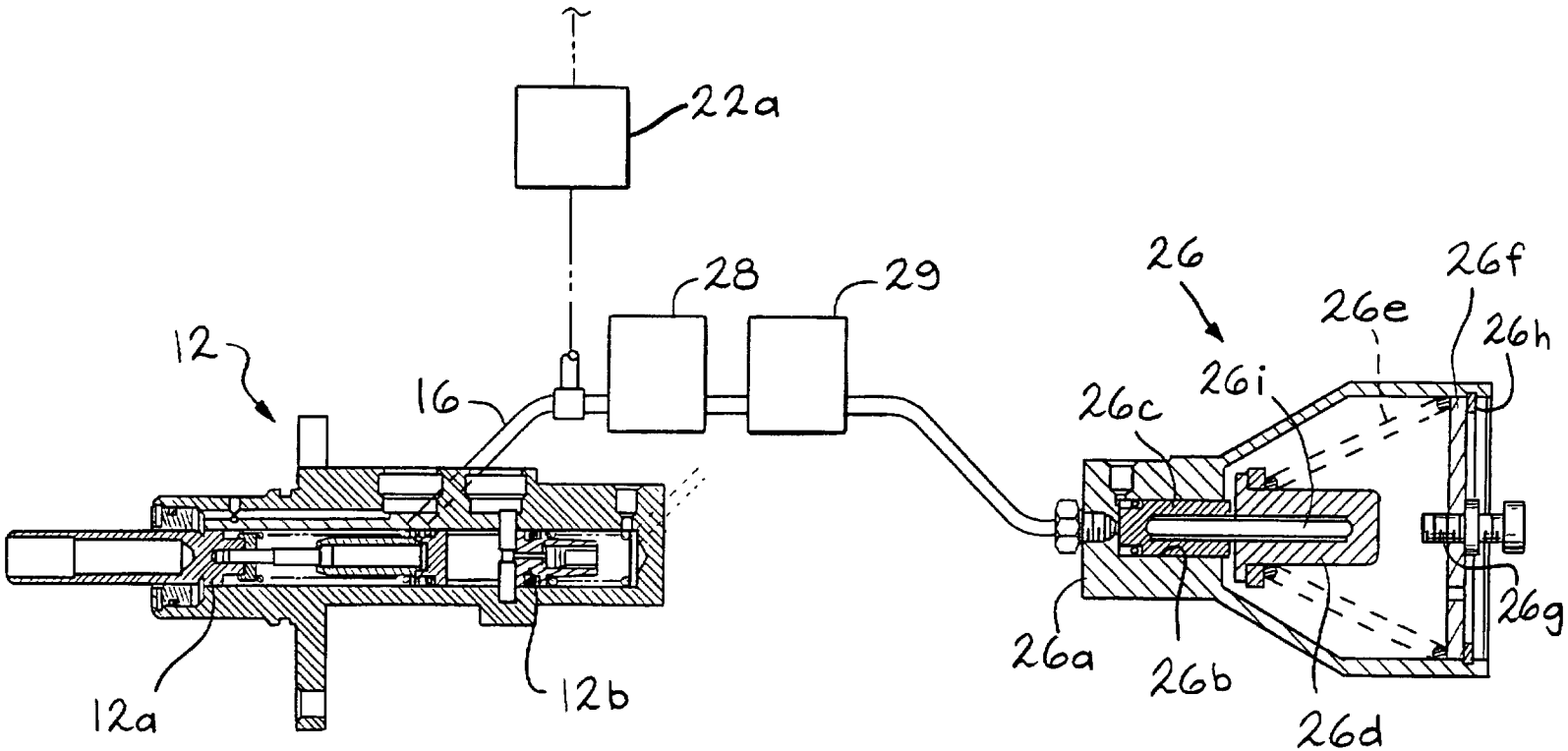
FIG. 6 is a sectional view of specific embodiments for a master cylinder and a pedal simulator which can be used for the brake systems of the present invention.

As shown in detail in FIG. 6, the pedal simulator 26 includes a housing 26a having a bore 26b. A piston 26c is slideably disposed within the bore 26b. The piston 26c is coupled to a cupped flanged member 26d. Rightward movement of the piston 26c from the position illustrated in FIG. 6 compresses a conical spring 26e against a plate 26f. The pedal simulator 26 also includes an adjustable stop member 26g threaded into the plate 26f which restricts the travel of the piston 26c and the flanged member 26d. The plate 26f is held in place against the force of the spring 26e by a snap ring 26h engaging a groove formed in the housing 26a. An elongate member 26i couples the piston 26c and the cupped flanged member 26d to keep the piston 26c and the cupped flanged member 26d in alignment and to transfer forces therebetween.

The pedal simulator 26 is connected to the conduit 16 so that when the brake pedal 14 is depressed, pressurized brake fluid from the master cylinder 12 is directed through the conduit 16 to the pedal simulator 26 to drive the piston 26c to compress the spring 26e. As the spring 26e compresses, the spring 26e exerts increased resistance to further movement of the piston 26c. As will be explained in detail below, the spring 26e preferably has a progressive rate, resulting in a greater resistance to further movement, per unit of displacement of the brake pedal 14, when the brake pedal 14 is near the end of the pedal stroke than when the brake pedal 14 is first depressed. In this manner, the pedal simulator 26 can mimic the progressively greater incremental resistance to pedal movement felt in conventional braking systems. One way of causing the spring 26e to have a progressive spring rate is to form the spring 26e as a conical helical spring with a varying pitch, that is, with each wrap of the spring 26e being inclined differently relative to a plane (not shown) defined perpendicular to a central axis 26j of the spring 26e.

As the spring 26e of the pedal simulator 26 exerts greater resistance, pressure in the conduit 16 is increased due to the resistance to further movement by the spring loaded piston 26c. This resistance to movement is fed back to the pedal 14 through the increased pressure of the conduit 16 reacting in the master cylinder 12, so that the operator of the brake pedal feels an increasing resistance as the brake pedal 14 is depressed, similar to the resistance felt when the master cylinder 12 is hydraulically coupled to the vehicle brakes 11a and 11b. The pressure in the conduit 17 will rise along with the pressure in the conduit 16 in the ordinary manner For example, if the master cylinder 12 is a tandem axial master cylinder, increased pressure in the primary chamber (not shown) of the master cylinder 12 and the conduit 16 is fed to the secondary chamber (not shown) of the master cylinder 12 and the conduit 17 by movement of the master cylinder secondary piston (not shown).

While the pedal simulator 26 preferably is embodied as the piston 26c acting against a single metal coil spring 26e, as shown in FIGS. 1 and 6, other designs of pedal simulators are contemplated for use as part of the invention. For example, the pressurized hydraulic brake fluid in the pedal simulator 26 may act against any suitable spring arrangement such as a plurality of coiled springs arranged to act in series or parallel to each other, and may suitably interact to deliver the desired progressive spring rate. Furthermore, the spring of the pedal simulator 26 may be made of any suitable material. For example, the spring may be an elastomeric spring The piston 26c of the pedal simulator 26 may be replaced by a diaphragm acting against a spring, or some other flexible or movable fluid separator. As a further example, the pedal simulator 26 could include a piston, diaphragm, or bladder as a fluid separator, a first side of which is acted upon by the pressurized brake fluid from the master cylinder 12, and a second side of which is acted upon by a fluid, the pressure of which may increase naturally as the pressure in the brake circuits increase (such as a fixed volume of gas), or which may be selectively controlled. It is specifically contemplated that the pressure of the fluid on the second side of such a fluid separator in the pedal simulator 26 could be controlled to selectively adjust the damping and spring rate characteristics of the pedal simulator 26. Such pressure control could be achieved by any desired means, such as pressure feedback, electronic control of suitable pumps or valves or other mechanical actuators, or actuators achieving displacement principally due to a material therein undergoing a phase change.

It is also contemplated that such a fluid separator in the pedal simulator 26 could be acted on directly by a selectively operated mechanical actuator By controlling the spring rate and damping characteristics of the pedal simulator 26, the pedal feel experienced by the operator of the vehicle can be controlled when the brake pedal 14 is depressed and released. In yet another design variation, the pedal simulator 26 could be embodied as a chamber in which is situated an amount of a suitable material, such as a block of an elastomeric material, having a desired set of physical characteristics. The material is elastically compressed as the pressure of the brake fluid in the pedal simulator 26 increases. The material could contain internal chambers filled with a gas.

The brake system 2 preferably includes an optional dampening circuit, shown schematically as block 29 in FIG. 1, and an optional expansion volume unit, shown schematically as block 31 in FIG. 1. As will be discussed in detail below, the dampening circuit 29 and the expansion volume unit 31 cooperate with the pedal simulator 26 to provide for improved brake pedal feel, which as indicated above, is the response characteristic experienced by the operator of the vehicle while operating the brake pedal 14.

The pressure in the conduit 16 between the master cylinder 12 and the isolation valve 22a is monitored by a pressure transducer 30 which supplies a signal representative of the sensed pressure to the control module 10 as a brake demand signal. Note that the signal from the brake pedal displacement transducer 19 may be used instead of the pressure signal from the pressure transducer 30 as the brake demand signal, or may be used as a backup or check signal to verify proper operation of the pressure transducer 30. If desired, the pressure in the conduit 17 can also be monitored by a pressure transducer (not shown).

Preferably, however, the displacement signal from the pedal transducer 19 and the pressure signal from the pressure transducer 30 are blended together in a suitable fashion to create a system brake demand signal. For example, during the first portion of pedal travel, pressure measured by the pressure transducer 30 does not increase greatly compared to the amount of pedal travel. It may be difficult to accurately determine the desired braking demand from the pressure signal produced by the pressure transducer 30, as the increase in the pressure signal may be difficult to differentiate from normal electronic background "noise". Thus, in the first part of pedal travel, the signal from the pedal transducer 19 can be a better indicator of desired braking, and can be given increased weight in determining the brake demand signal. However, in the latter part of the pedal stroke, the pressure monitored by the pressure transducer 30 can change significantly with only a small change in position of the brake pedal 14, and thus a relatively small change in the brake pedal signal produced by the pedal transducer 19. Thus, in this region, the signal from the pressure transducer 30 may be a more accurate determinator of the desired braking, and thus given greater weight in determining the brake demand signal. In an intermediate portion of the pedal stroke, the signal from the pressure transducer 30 and the signal from the pedal transducer 19 can be given equal weight in determining the brake demand signal.

The pressure signal from the pressure transducer 30 is proportional to the force exerted by the driver on the pedal 14. Instead of using a pressure transducer to measure pressure resulting from the force exerted by the driver on the brake pedal 14, it is contemplated that a direct measurement of the force upon the brake pedal may be obtained by use of a strain gauge suitably positioned in the linkage extending from the brake pedal 14 to the pistons of the master cylinder 12. This measure may be used in developing a brake demand signal instead of the signal from the pressure transducer 30.

One preferred embodiment of an algorithm for a brake demand signal develops a signal $P_{BBW}$, which represents the pressure at which the normal source 4 is being commanded by the driver to deliver hydraulic fluid pressure to the brakes 11a, b, c, and d. This signal may be overridden by such automatic controls as collision avoidance signals or antilock braking control signals. $P_{BBW}$ is developed from a travel command component, $P_{CMD_TRAVEL}$, and a force command component, $P_{CMD_FORCE}$. The force command component $P_{CMD_FORCE}$ is developed from the pressure signal from the pressure transducer 30 (or a force sensor, as discussed above). $P_{CMD_TRAVEL}$ and $P_{CMD_FORCE}$ are conditioned for backlash (hysterisis) and subjected to limits prior to being input to develop $P_{BBW}$.

$P_{CMD_Travel}$ has both proportional and squared functions, as indicated by the following equation:

$$P_{CMD_TRAVEL}=P_T\times k_1+P^2{}_T\times k_2 \tag{1}$$

where $P_T$ is the conditioned signal from the displacement transducer 19, and $k_1$ and $k_2$ are gain factors constants which may be suitably adjusted to further condition $P_{CMD_TRAVEL}$. $P_{CMD_FORCE}$ also has both proportional and squared functions, as indicated by the following equation:

$$P_{CMD_FORCE}=P_F\times k_3+P^2{}_F\times k_4 \tag{2}$$

where $P_F$ is the conditioned signal from the pressure transducer 30, and $k_3$ and $k_4$ are gain factors constants which may be suitably adjusted to further condition $P_{CMD_FORCE}$.

$P_{CMD_FORCE}$ and $P_{CMD_TRAVEL}$ as developed in equations 1 and 2 above are blended to develop $P_{BBW}$ according to the following two equations (3 and 4):

$$W_{BLEND}=P_F\times k_{BLEND}-P_{BLEND_OFFSET}|^{high}_{low}\text{limit} \tag{3}$$

$$P_{BBW}=P_{CMD_TRAVEL}\times(1-W_{BLEND})+P_{CMD_FORCE}\times W_{BLEND} \tag{4}$$

With this system, one measures the drivers intent through pedal travel and force "electrically". These signals are electrically blended to provide a desired command to the normal source 4. The output is applied through a resolution circuit (not shown) which sets a limitation on the signal to control the minimum step of change to limit hunting and noise. The signal is further conditioned in a slew circuit to limit the rate of commanded pressure apply. The signal is further subjected to limits in terms of the maximum pressure which can be commanded. If pedal travel and force are both at minimum, a default negative pressure command signal is preferably switched in to force $P_{BBW}$ to a negative valve. This insures that the pressure control valve of the normal source 4 (discussed in detail below) smoothly transitions to a zero pressure out condition during a pressure reduction cycle before the spool of the pressure control valve is "parked", and avoiding "hunting" or "simmering" of the control valve due to noise in the circuitry when there is no actual demand signal.

As the operator of the vehicle depresses the brake pedal 14, the master cylinder 12 is actuated, thereby causing an increase in pressure within the conduits 16 and 17. The increase pressure within the conduit 16 compresses the spring of the pedal simulator 26, and the pressure in the conduit 16 is sensed by the pressure transducer 30. The pedal simulator 26 is provided so that the operator of the vehicle experiences a consistent pedal feel, whether or not the isolation valves 22a and 22b are closed. It is also contemplated that the simulator valve 28 may be omitted. If the simulator valve 28 is omitted, the master cylinder 12 should pressurize a sufficient volume of brake fluid to supply both the pedal simulator 26 and actuate the vehicle brakes 11a and 11b with adequate pressure in the event of a failure of the normal source 4.

The pressure in the conduits 16 and 17 between each isolation valve 22a and 22b, and the respective vehicle brake 11a and 11b, is sensed by respective pressure transducers 36a and 36b, which supply signals representative of the respective sensed pressures to the control module 10. The control module 10 utilizes the pressure signals produced by the pressure transducers 36a and 36b for purposes which will be described below. As also will be further described below, the control module 10 controls the operation of the simulator valve 28 and the isolation valves 22a and 22b.

As indicated above, the isolation valves 22a and 22b are energized and shut during normal operation of the brake system 2. Only in an abnormal situation, such as a loss of electrical power, will the isolation valves 22a and 22b remain open after the driver initiates a brake demand signal by depressing the brake pedal 14. In such a situation, the master cylinder 12 acts to supply pressurized hydraulic brake fluid to the vehicle brakes 11a and 11b through the open isolation valves 22a and 22b. However, absent some type of failure, it is intended that the normal source 4 should supply pressurized hydraulic brake fluid for actuating the vehicle brakes 11a, b, c, and d.

The normal source 4 includes a pump 42 which is capable of pumping hydraulic brake fluid from the reservoir 20 to actuate the vehicle brakes 11a, b, c, and d. The pump 42 is preferably electrically driven by a motor 43 under the control of the control module 10. However, the pump 42 may be driven by any suitable means, with the output of the pump 42 being controlled by the control module 10. The normal source 4 is provided with over-pressure protection by a relief valve 44 which opens when a preset pressure is exceeded to direct pressurized brake fluid from the discharge of the pump 42 back to the reservoir 20.

Pressurized hydraulic brake fluid from the pump 42 is supplied to a high pressure accumulator 46 through a check valve 47. The check valve 47 allows brake fluid to flow from the discharge of the pump 42 and restricts brake fluid from flowing into the pump 42 through the discharge port. The accumulator 46 is conventional, including a piston movable with a sliding seal within the cylinder of the accumulator 46, and a pre-charge of nitrogen acting as a spring element. Other suitable spring elements which are contemplated include a compressible volume of any other suitable gas, a metallic or elastomeric spring, or other spring arrangement. The pre-charge of nitrogen contained in the accumulator 46 biases the piston toward the fluid connection of the accumulator 46. Of course, any suitable accumulator design may be used, and the accumulator 46 need not be of the piston design depicted. For example, the accumulator 46 may be of the diaphragm type, with a diaphragm or bellows made of metal, rubber, or plastic or other elastomer.

As pressurized hydraulic brake fluid flows into the accumulator 46 through the fluid connection, the piston of the accumulator 46 is moved to further compress the nitrogen gas precharge. In this condition, the accumulator 46 contains a reservoir of hydraulic brake fluid which is pressurized by the piston under the influence of the compressed nitrogen gas, which may be used to actuate the vehicle brakes 11a, b, c, and d whether or not the pump 42 is running. The pressure of the hydraulic brake fluid in the accumulator 46 is sensed by a pressure transducer 49, which supplies a corresponding signal to the control module 10.

The normal source 4 also includes a pressure isolation valve 48. The pressure isolation valve 48 is controlled by the control module 10 to move between a de-energized position, shown in FIG. 1, in which pressurized brake fluid in the accumulator 46 is prevented from discharging from the accumulator 46, and an energized position in which pressurized brake fluid can flow out of the accumulator 46. The pressure isolation valve 48 will normally be deenergized closed to prevent discharge of the accumulator 46 due to system leakage past various other system valves. Note that the high pressure relief valve 44 and the check valve 47 cooperate with the pressure isolation valve 48 to prevent the fluid within the accumulator 46 from discharging when the pressure isolation valve 48 is shut. When braking is required, the pressure isolation valve 48 is energized open to allow the pressurized hydraulic brake fluid in the accumulator 46 to be used to apply the vehicle brakes 11a, b, c, and d. The location of the pressure isolation valve 48 in the brake system 2 provides for over-pressure protection for the accumulator 46 by the relief valve 44.

Through the pressure isolation valve 48, the outlet of the pump 42 and the accumulator 46 are in fluid communication with a fluid conduit 50. The fluid conduit 50 is in fluid communication with proportional control valves 51a, b, c, and d. A filter 52 is preferably provided in the fluid conduit 50 between the sources of pressurized hydraulic brake fluid (the pump 42 and the accumulator 46) and the proportional control valves 51a, b, c, and d to remove contaminating particles from the hydraulic brake fluid supplied to the proportional control valves 51a, b, c, and d.

The illustrated proportional control valve 51 a has a port which is in fluid communication with a fluid separator unit 54a. The proportional control valve 51b has a port which is in fluid communication with a fluid separator unit 54b. The fluid separator unit 54b is similar in structure and function to the fluid separator unit 54a. As shown in more detail in FIG. 7, the fluid separator unit 54a includes a housing 55 with a cylindrical bore 55a therethrough. A first end 55b of the bore 55a is in fluid communication with the proportional control valve 51a. A second end 55c of the bore 55a is in fluid communication with the vehicle brake 11a.

A fluid separator piston 56 is slideably disposed within the cylindrical bore 55a between the first end 55b and the second end 55c of the bore 55a. The piston 56 is generally cylindrical, having a first piston face 56a in fluid communication with the normal source 4 via the first end 55b of the bore 55a and a second piston face 56b in fluid communication with the backup source 6 via the second end 55c of the bore 55a. The piston 56 is preferably formed with a pair of axially spaced apart, circumferentially extending grooves 56c and 56d. The groove 56c is formed near the first piston face 56a, while the groove 56d is formed near the second piston face 56b. The piston 56 is further formed with a reduced diameter projection 56e extending axially from the second piston face 56b. Preferably the piston 56 is also formed with a raised boss 56f on the first piston face 56a. The boss 56f assists in preventing a hydraulic lock between the piston 56 and the adjacent end wall of the bore 55a when the piston 56 is in the unactuated position shown in FIG. 7

A first seal 57a, which is preferably a lip seal, is disposed in the first groove 56c formed in the piston 56 and oriented to slidingly seal between the piston 56 and the wall of the bore 55a against pressurized hydraulic brake fluid from the normal source 4 supplied to the first end 55b of the bore 55. The first seal 57a and the piston face 56a cooperate to define a first working face of the piston 56.

Similarly, a second seal 57b, which is also preferably a lip seal, is disposed in the second groove 56d formed in the piston 56. The second seal 57b is oriented to slidingly seal between the piston 56 and the wall of the bore 55a against pressurized hydraulic brake fluid from the backup source 6 at the second end 55c of the bore 55. The second seal 57b and the piston face 56b, including the extension 56e, cooperate to define a second working face of the piston 56.

Figure 7:
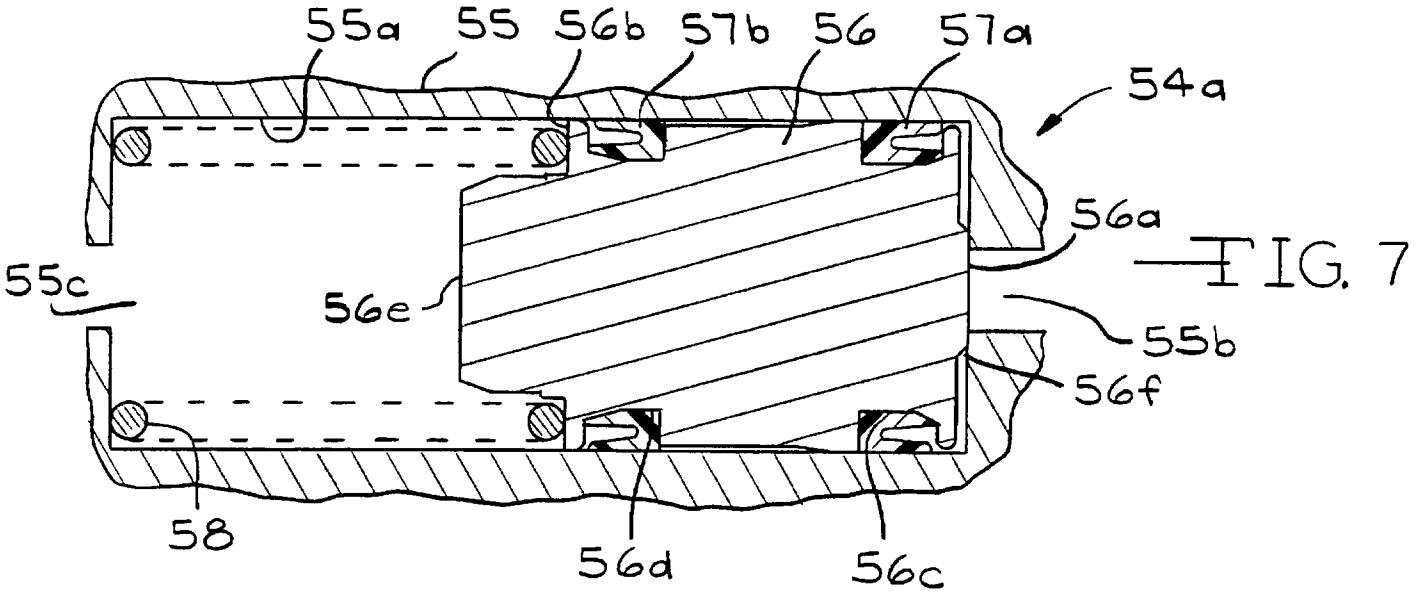
FIG. 7 is an enlarged cross-sectional view of a fluid separator piston which may be used in the fluid separator units of FIG. 1.

It will be appreciated from FIG. 7 that the diameter of the piston 56 is the same in the region of the seal 57a as it is in the region of the seal 57b. Thus, the cross-sectional area of the first working face of the piston 56 (the area acted upon by the adjacent volume of hydraulic brake fluid) is the same as the cross-sectional area of the second working face of the piston 56. Furthermore, the bore 55a is of constant diameter. These features [of the invention] are believed to simplify construction of the fluid separator unit 54a and reduce costs compared to a possible alternate construction having a stepped bore and stepped piston sliding therein. In the fluid separator unit 54a, pressurized fluid from the [backup source 6] *normal source 4* actuates the piston 56 of the fluid separator unit 54a to pressurize the trapped hydraulic brake fluid between the isolation valve 22a and the wheel brake 11a to substantially the same pressure as the pressure at which the hydraulic brake fluid is supplied to the fluid separator unit 54a from the [backup source 6] *normal source 4*. Any differences due to the compression of the spring 58 of the fluid separator unit 54a and friction are generally negligible fractions of the pressures of the hydraulic brake fluid acting in the fluid separator unit 54a during braking.

The fluid separator unit 54a permits pressure in the hydraulic brake fluid on one side of the piston 56 (acting on one of the first and second working faces of the piston 56) to be transferred to the hydraulic brake fluid on the other side of the fluid separator piston 56 (acting on the other of the first and second working faces of the piston 56) through movement of the fluid separator piston 56 within the bore 55a. The fluid separator unit 54a is sealed to the wall of the bore 55a by the seals 57a and 57b to prevent intermixing of the hydraulic brake fluids on either side of the piston 56. As will become apparent, a primary purpose of the fluid separator unit 54a (and of the fluid separator unit 54b) is to maintain the integrity and operability of the backup source 6 of hydraulic brake fluid even in the event of a malfunction or rupture of the normal source 4.

A spring 58 is provided which biases the fluid separator piston 56 toward the unactuated position of the piston 56, at the first end 55b of the bore 55a of the fluid separator unit 54a. The fluid separator piston 56 is constrained to remain in the bore 55a, and thus a complete loss of hydraulic brake fluid and pressure on one side of the fluid separator piston 56 of the fluid separator unit 54a will not result in loss of fluid or complete loss of pressure on the other side of the fluid separator piston 56. As pressurized hydraulic brake fluid flows into the fluid separator unit 54a from the proportional control valve 51a, the fluid separator piston 56 is moved to an actuated position, compressing the spring 58. The piston 56 acts on the hydraulic brake fluid in the second end 55c of the bore 55, thereby pressurizing the hydraulic brake fluid trapped between the energized isolation valve 22a and the vehicle brake 11a and causing the vehicle brake 11a to be applied. The normal source 4 also includes a fluid separator unit 54b connected (in an arrangement similar to that of the fluid separator unit 54a, the control valve 51 a and the brake 11a) between the control [valves] *valve* 51b and the vehicle brake 11b. The fluid separator unit 54b is similar in construction and operation to the fluid separator unit 54a.

Figure 9:
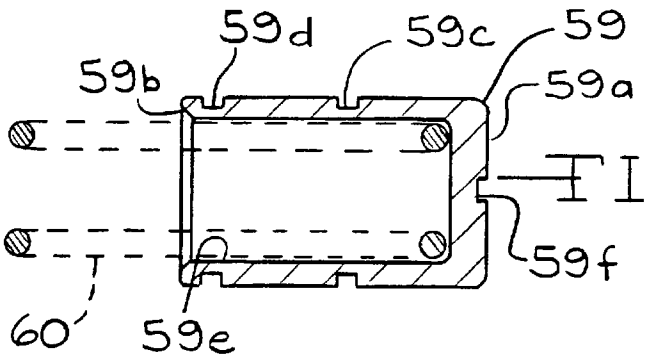
FIG. 9 is a view taken along the line 9-9 of FIG. 8.
Figure 8:
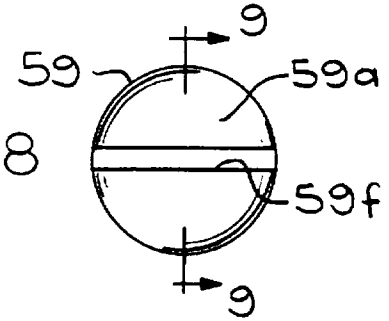
FIG. 8 is an end elevational view of a piston which may be used in the fluid separator units of FIG. 1, showing a groove formed in the working face thereof.

FIGS. 8 and 9 illustrate a piston 59 which is an alternate embodiment of a piston which can be used in the fluid separator units 54a and 54b in lieu of the piston 56. As shown therein, the piston 59 is a generally cup-shaped cylindrical piston, having a first piston face 59a in fluid communication with the normal source 4 via the first end 55b of the bore 55a and a second piston face 59b in fluid communication with the backup source 6 via the second end 55c of the bore 55a. The piston 59 is preferably formed with a pair of axially spaced apart, circumferentially extending grooves 59c and 59d. The groove 59c is formed near the first piston face 59a, while the groove 59d is formed near the second piston face 59b. The piston 59 is further formed with a recess 59e extending axially into the piston 59 from the second piston face 59b.

If [desire] *desired*, a groove 59f may be defined in the first piston face 59a of the piston 59. The groove 59f, like the boss 56f, assists in preventing hydraulic locking of the piston 59 at the unactuated position thereof. The groove 59f may be formed to extend only partially across the first face 59a of the piston 59, and still be effective in preventing hydraulic locking of the piston 59.

A first seal (not shown), which is preferably an o-ring, is disposed in the first groove 59c formed in the piston 59. The first seal slidingly seals between the piston 59 and the wall of the bore 55a, scaling against pressurized hydraulic brake fluid from the normal source 4 supplied to the first end 55b of the bore 55. The first seal and the piston face 59a cooperate to define a first working face of the piston 59.

Similarly, a second seal (not shown), which is also preferably an o-ring, is disposed in the second groove [56d] *59d* formed in the piston [56] *59*. The second seal slidingly seals between the piston 56 and the wall of the bore 55a, sealing against pressurized hydraulic brake fluid from the backup source 6 at the second end 55c of the bore 55. The second seal and the piston face [56b] *59b*, including the recess [56e] *59e*, cooperate to define a second working face of the piston [56] *59*.

A spring 60 is disposed partially in the recess 59e and acts between the piston 59 and the end wall at the second end of the bore 55a to urge the piston 59 to a retracted position thereof at the first end 55b of the bore 55a. In operation, the piston 59 acts similarly to the piston 56.

Each of the proportional control valves 51a, b, c, and d are electrically positioned by the control module 10. In a first energized position, the apply position, the proportional control valve 51a or b directs the pressurized hydraulic brake fluid supplied to the proportional control valve 51 a or 51b from the fluid conduit 50 to the associated fluid separator unit 54a or 54b. In a second energized position, the maintain position, the proportional control valve 51a or 51b closes off the port thereof which is in communication with the associated fluid separator unit 54a or 54b, thereby hydraulically locking the associated fluid separator piston of the fluid separator unit 54a or 54b in a selected position. In a de-energized position, the release position, the spool of the proportional control valve 51a or 51b is moved by a spring to the position illustrated in FIG. 1, where the proportional control valve 51a or 51b provides fluid communication between the associated fluid separator unit 54a or 54b and the reservoir 20. This vents pressure from the associated fluid separator unit 54a or 54b, allowing the piston 56 thereof to move back to the unactuated position thereof under the urging of the associated spring 58, thereby reducing pressure at the associated vehicle brake 11a or 11b. The proportional control valves 51c and 51d generally operate in the same manner as the proportional control valves 51a and 51b, except that there is not a fluid separator unit positioned between the proportional control valves 51c and 51d and the respective vehicle brakes 11c and 11d since the backup source 6 does not supply the vehicle brakes 11c and 11d. The pressures in the conduits between each proportional control valve 51c and 51d, and the respective vehicle brake 11c and 11d, is sensed by respective pressure transducers 36c and 36d, which supply signals representative of the respective sensed pressures to the control module 10.

Preferably, the positions of the proportional control valves 51a, b, c, and d are controlled so that the controlled pressures are proportional to the current of the energizing electrical signal. The controlled pressure for the proportional control valves 51a or 51b is the fluid pressure in the fluid conduit between the respective proportional control valve 51a or 51b and the associated fluid separator unit 54a or 54b. The controlled pressure for the proportional control valves 51c or 51d is the fluid pressure in the fluid conduit between the respective proportional control valve 51c or 51d and the associated vehicle brake 11c or 11d. A respective pressure feedback conduit 61a, b, c, or d is provided to the associated proportional control valve 51a, b, c, or d, so that controlled pressure opposes the movement caused in the proportional control valve 51a, b, c, or d caused by increasing energization of the solenoid thereof.

It may be desirable, however, to control the position of the proportional control valves 51a, b, c, and d, such that the exact position of a proportional control valve 51a, b, c, or d is proportional to the energizing electrical signal from the control module 10. Thus, the proportional control valves 51a, b, c, or d may be positioned at an infinite number of positions rather than just the three positions described above. In other words, the proportional valves 51a, b, c, or d may be positioned in the apply position, the maintain position, or the release position; the proportional valves 51a, b, c, or d may also be positioned to any position between the apply and maintain position to provide a throttled path for directing the pressurized hydraulic brake fluid to the associated fluid separator unit 54a, b, c, or d, and the proportional valves 51a, b, c, or d may be positioned to any position between the release position and the maintain position to provide a throttled path for venting the pressurized hydraulic brake fluid from the associated fluid separator unit 54a, b, c, or d to the reservoir 20. If it is desired to rapidly apply pressurized hydraulic brake fluid to the associated vehicle brake 11a, b, c, or d, the proportional control valve 51a, b, c, or d is moved fully to the first energized (apply) position. However, if it is desired to more slowly apply hydraulic brake fluid to the associated vehicle brake 11a, b, c, or d, the proportional control valve 51a, b, c, or d is moved to a position between the first (apply) and second (maintain) energized positions described above, so that pressurized hydraulic brake fluid can be applied to the associated vehicle brake 11a, b, c, or d at less than the maximum rate possible because the proportional control valve 51a, b, c, or d is throttled. Similarly, the proportional control valve 51a, b, c, or d may be moved to a position between the second (maintain) energized position and the de-energized position to vent pressurized hydraulic brake fluid from the associated vehicle brakes 11a, b, c, or d at less than the rate possible when the proportional control valve 51a, b, c, or d is in the de-energized (release) position.

The brake system 2 further includes a pair of normally open balance valves 62 and 64 which are electrically controlled by the control module 10. The balance valve 62 selectively isolates the fluid communication between the outlet ports of the proportional control valves 51a and 51b. The balance valve 64 selectively isolates the fluid communication between the vehicle brakes 11c and 11d. As will be discussed in detail below, another function of the balance valves 62 and 64 is to provide for calibration between the vehicle brakes 11a and 11b, and between the vehicle brakes 11c and 11d, respectively.

During normal braking, the control module 10 maintains the isolation valves 22a and 22b energized shut and the simulator valve 28 energized open, thereby isolating the master cylinder 12 from the vehicle brakes 11a and 11b, and hydraulically connecting the pedal simulator 26 to the master cylinder 12. Fixed volumes of hydraulic brake fluid are trapped between the isolation valve 22a and the vehicle brake 11a, and between the isolation valve 22b and the vehicle brake 11b. The pump 42 is suitably run to cooperate with the accumulator 46 to supply sufficient quantities of pressurized hydraulic brake fluid to meet the brake demand. Generally, the pump 42 is shut off by the control module 10 when a sufficient quantity of suitably pressurized hydraulic brake fluid has been generated to meet brake demand. In this manner, the fluid conduit 50 is pressurized up to the proportional control valves 5a, b, c, and d.

The pressure transducer 49 monitors the pressure in the accumulator 46 and the fluid conduit 50 (when the pressure isolation valve 48 is energized open), providing input to the control module 10. The control module 10 controls the operation of the pump 42 as needed to maintain pressure of the hydraulic brake fluid of the normal source 4. Suitably the control module 10 may be designed to alert the vehicle operator if the pressure response is not as expected.

In the event that an abnormal loss of pressure in the normal source 4, or other failure of the normal source 4, the control module 10 monitors the pressure transducer 49, 36a, 36b, 36c, 36d and 30 to attempt to determine the extent of the abnormality. Pre-programmed degraded control schemes are preferably programmed into the control module 10. As will be discussed below, the control module 10 may maintain braking control from the normal source 4 in certain degraded conditions. In certain other conditions, the control module 10 may cause pressurized hydraulic brake fluid for operation of the vehicle brakes 11a and 11b to be supplied from the manual backup source 6, from the master cylinder 12. In this case, the isolation valves 22a and 22b, the simulator valve 28, and the proportional control valves 5a, b, c, and d are deenergized, thereby connecting the vehicle brakes 11a and 11b to the master cylinder 12 for manual control. Note that even a rupture of the fluid conduit 50 of the normal source 4, and a complete draining of hydraulic brake fluid from the normal source 4, will not prevent the operation of the vehicle brakes 11a and 11b by the master cylinder 12, since the fluid separator units 54a and 54b will prevent any loss of hydraulic brake fluid from the conduit 16 or the conduit 17 of the backup source 6 to the piping of the normal source 4.

During normal braking, however, with the normal source 4 available, the operator of the vehicle generates a manual brake demand signal by depressing the brake pedal 14. Depressing the brake pedal 14 sends pressurized hydraulic brake fluid to the pedal simulator 26. The pressure of the hydraulic brake fluid in the pedal simulator 26 increases as the brake pedal 14 is further depressed, owing to further compression of the spring 26e of the pedal simulator 26. The resultant rise in pressure in the conduit 16 is monitored by the pressure transducer 30. As indicated above, the output signal of the pressure transducer 30 is a brake demand signal sent to the control module 10. The more the brake pedal 14 is depressed, the greater the brake demand signal developed by the pressure transducer 30. Similarly, the more the brake pedal 14 is depressed, the greater the brake demand signal generated by the brake pedal displacement transducer 19 which is sent to the control module 10. As described above, the brake demand signals generated by the displacement transducer 19 and the pressure transducer 30 are combined to generate a system brake demand signal.

Various automated brake demand signals and brake modulation signals may be supplied to the control module 10. For example, it may be desired to actuate one or more of the vehicle brakes 11a, b, c, and d for purposes of traction control, coordinated vehicle stability control, hill hold, or automated collision avoidance control schemes, even when the vehicle operator is not depressing the brake pedal 14. Similarly, it may be desired to temporarily decrease the braking force of one or more of the vehicle brakes 11a, b, c, and d for the purposes of antilock braking even if the operator is depressing the brake pedal 14. Signals which may be supplied to the control module 10 for the purposes of such automated control schemes may include wheel speed of each of the vehicle's wheels, vehicle deceleration, steering angle, vehicle yaw rate, vehicle speed, vehicle roll rate, and signals from radar, infrared, ultrasonic, or similar collision avoidance systems, cruise control systems (including AICC—Autonomous Intelligent Cruise Control Systems), and the like. It may also be desirable to actuate one or more of the vehicle brakes 11a, b, c, and d for purposes of panic brake assist when the vehicle operator is depressing the brake pedal 14.

When braking is demanded at one or more of the vehicle brakes 11a, b, c, and d, the pressure isolation valve 48 is opened, and the appropriate proportional control valve(s) 51a, b, c, and d are energized to an apply position. The balance valves 62 and 64 are normally actuated to a closed position during braking, thereby isolating the vehicle brakes 11a, b, c, and d from each other. For the vehicle brakes 11a and 11b, pressurized hydraulic brake fluid from the normal source 4 is applied to the fluid separator piston(s) 56 of the respective fluid separator unit(s) 54a and 54b, causing the fluid separator piston(s) 56 to move toward the second end 55c of the bore 55a, compressing the spring 58, and forcing pressurized hydraulic brake fluid out of the second end 55c of the fluid separator unit(s) 54a and 54b. Since there is already a trapped volume of hydraulic brake fluid between the vehicle brakes 11a and 11b and the associated isolation valve 22a and 22b, the pressurized hydraulic brake fluid from the fluid separator unit(s) 54a and 54b causes the associated vehicle brake(s) 11a and 11b to be applied. Since there are no fluid separator units associated with the vehicle brakes 11c and 11d, pressurized hydraulic brake fluid from the proportional control valves 51c and 51d, respectively, is applied to the associated vehicle brakes 11c and 11d. Of course, fluid separator units could suitably be added between the proportional control valves 51c and 51d and the associated vehicle brakes 11c and 11d together with selective fluid communication with the master cylinder 12 if it is desired to provide manual braking to the rear vehicle brakes 11c and 11d.

The pressure of the hydraulic brake fluid applied to the vehicle brakes 11a, b, c, and d is monitored by the associated pressure transducers 36a, b, c, and d. When a desired brake pressure is reached in a vehicle brake 11a, b, c, or d, the control module 10 will cause the associated proportional control valve 51a, b, c, or d to move to the maintain position, to hold the desired pressure. If the accumulator 46 is unable to supply sufficient pressure and volume of pressurized hydraulic brake fluid to the proportional control valves 5a, b, c, and d, the pump 42 is started to supply the needed pressurized hydraulic brake fluid.

When the pressure at the vehicle brake 11a, b, c, or d is no longer the desired pressure, the control module 10 will position the associated proportional control valve 51a, b, c, or d to apply more pressurized fluid to increase the pressure applied, or to vent pressurized brake fluid to the reservoir 20 to decrease or release the pressure applied, as appropriate, in response to the varying brake and modulation demand signals and the control scheme programmed into the control module 10.

After installation of the brake system 2 or during periodic intervals, the brake system 2 can be calibrated to determine the zero point reading for each of the pressure transducers 36a, b, c, and d. During a non-braking situation, in which the brake pedal 14 is not depressed and the master cylinder 12 and the normal source 4 are not actuated, the balance valves 62 and 64 are left in their unactauted open position. A first reading is taken of each pressure transducer 36a, b, c, and d to determine a zero reference value. After the first reading has been recorded, the balance valves 62 and 64 are actuated to a closed position. The normal source 4 is then actuated and the proportional valves 51a, b, c, and d are energized to an apply position to increase the pressure within the fluid conduits from the proportional control valves 51a, b, c, and d to the associated vehicle brakes 11a, b, c, and d. The normal source 4 and the proportional control valves 51a, b, c, and d can be actuated by a calibrating command signal from the control module 10 or by depressing the brake pedal 14 to actuate the brake system 2 as described above. A second reading is taken of each pressure transducer 36a, b, c, and d to determine a signal gain. Preferably, the second reading is taken after the pressure increase generally levels out so that the fluid flow effects of the brake fluid through the brake system 2 do not adversely affect the reading. If desired, several pressure readings can be taken at different pressure levels to check the linearity of the response for each of the pressure transducers 36a, b, c, and d.

The calibration method described above operates under the assumption that the proportional control valves 51a, b, c, and d are functioning properly. This assumption can be generally verified by checking that the pressure readings of the pressure transducers 36a, b, c, and d are within an expected value range. If the readings of the pressure transducers 36a, b, c, and d are not within an expected value range, the brake system 2 can be further analyzed by first deenergizing the balance valves 62 and 64 to an open position. The proportional control valves 51a, b, c, and d are then operated individually and the readings of the pressure transducers 36a, b, c, and d are monitored to determine which wheel fluid circuit may be faulty.

The balance valves 62 and 64 are normally in a non-actuated open position during a non-braking condition, thereby conserving or reducing current consumption of the brake system 2.

The balance valves 62 and 64 also provide fail-safe backup in certain conditions of system failure. If a proportional control valve 51a, b, c, or d is not properly supplying the required pressure to its associated vehicle brake 11a, b, c, or d, the associated balance valve 62 or 64 can be opened so that the other proportional control valve 51a, b, c, or d of an associated pair can actuate the vehicle brake 11a, b, c, or d. For example, if the vehicle brake 11a was not receiving pressure from the normal source 4, such as by failure of the proportional control valve 51a or a rupture within the piping from the normal source 4 to the vehicle proportional control valve 51a, the balance valve 62 can be deenergized to an open position. The proportional control valve 51b can then be used to supply pressurized fluid to both of the vehicle brakes 11a and 11b. Similarly, if the vehicle brake 11b failed, the proportional control valve 51a can be used to supply pressure to the vehicle brake 11b. Likewise, for the pair of vehicle brakes 11c and 11d, the balance valve 64 can be deenergized to an open position so that the unfailed proportional control valve 51c or 51d can supply pressure to both vehicle brakes 11c and 11d.

In another failure scenario, if a pressure transducer 36c or 36d senses a pressure drop (such as caused by a rupture in one of the fluid lines connected to the vehicle brake 11c or 11d), the balance valve 64 can be actuated to remain in a closed position even when no braking is in progress so that air cannot enter both of the fluid lines supplying pressurized fluid to the remaining operable vehicle brake 11c or 11d. In the event that an abnormal pressure drop is detected between one of the fluid separator units 54a or 54b and the respective pressure control valve 51a or 51b, the balance valve 62 can be actuated to a closed position during periods of braking and non-braking so that air cannot enter both of the fluid lines supplying pressurized fluid to the remaining operable vehicle brake 11a or 11b. Note, if an abnormal pressure drop is detected on the other side of a fluid separator unit 54a or 54b (in the fluid lines between a fluid separator unit 54a or 54b and the respective vehicle brake 11a or 11b), the appropriate isolation valve 22a or 22b is actuated to a closed position.

Note that even a rupture of the fluid conduit 50 of the normal source 4, and a complete draining of hydraulic brake fluid from the normal source 4 will not prevent the operation of the vehicle brakes 11a and 11b by the master cylinder 12, since the fluid separator units 54a and 54b will prevent any loss of hydraulic brake fluid from the conduit 16 or the conduit 17 to the normal source 4.

It should be noted that many of the components described and illustrated as discrete components may be easily combined in a single compact housing. For example, the master cylinder 12, the isolation valves 22a and 22b, the simulator valve 28, the pedal simulator 26 and one or more travel transducers and one or more pressure transducers 30, could be integrated into one unit with or without the reservoir 20 included therein. Similarly, the fluid separator units 54a and 54b, the proportional control valves 51a, b, c, and d, the balance valves 62 and 64, the pressure transducers 36a, b, c, and d, the filter 52, and the relief valve 44 could be integrated into a single unit. The accumulator 46, the pressure isolation valve 48, the relief valve 44, the pump 42 with motor, and the pressure transducer 49 could be incorporated into one unit. The control module 10 (also known as an ECU—Electronic Control Unit) could be integrated into the unit containing the pump 42. Indeed, it is contemplated that any or all of the components discussed in this paragraph could be highly integrated into one unit.

It is also contemplated that the fluid separator units 54a and 54b can be integrated into their respective vehicle brake 11a and 11b (for example, in the caliper of a disc brake or the actuator of a drum brake).

The brake pedal detector 18 and pedal displacement transducer 19 may be integrated into a package with the brake pedal 14 or the master cylinder 12. It may also be desired to provide a pedal simulator 26 for each of the conduits 16 and 17.

It should also be noted that it is generally desirable to use compact components to allow the brake system 2 to fit within the space constraints of modem vehicle designs. Therefore, it would be desirable to use a relatively compact master cylinder 12, with the brake system 2. It is expected that power assist (e.g., vacuum or hydraulic boost) of fluid pressure in the master cylinder is 12 will not be required, since the master cylinder 12 is not the normal source of pressurized brake fluid for actuating the vehicle brakes 11a, b, c, and d. However, if desired, vacuum or hydraulic boosters, or other suitable arrangements for increasing the force applied to operate the master cylinder 12, may be used.

Figure 2:
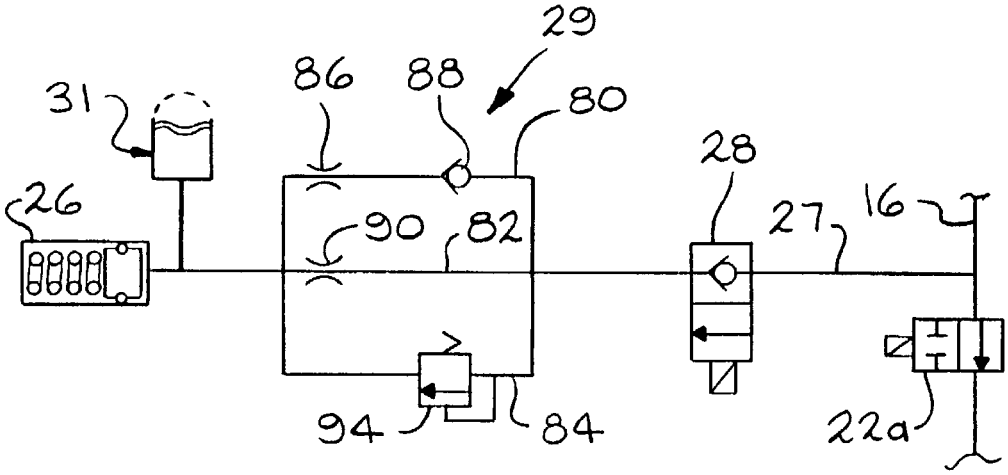
FIG. 2 is partial schematic view of the brake system of FIG. 1.

FIG. 2 illustrates a preferred embodiment of the damping circuit 29. The damping circuit 29 is hydraulically positioned between the pedal simulator 26 and the simulator valve 28. The dampening circuit 29 has three parallel fluid branches 80, 82, and 84. The fluid branch 80 includes an orifice 86 and a check valve 88. The check valve 88 restricts the flow of fluid through the fluid branch 80 in a direction from the simulator valve 28 to the pedal simulator 26 (referred to as the "apply direction"). The fluid branch 82 includes an orifice 90. Fluid is free to flow through the branch 82 in either the apply direction or in a direction from the pedal simulator 26 to the simulator valve 28 (referred to as the "release direction"). The fluid branch 84 includes a relief valve 94 which prevents the flow of fluid through the fluid branch 84 in the apply direction until a predetermined pressure is reached. When the predetermined pressure is reached, the relief valve 94 opens, thereby allowing fluid to travel through the fluid branch 84 in the apply direction. It will thus be apparent that when fluid is flowing in the release direction ("release direction flow"), the fluid can flow through both the fluid branches 80 and 82. In contrast, of the fluid branches 80 and 82, fluid can only s flow into the pedal simulator 26 ("apply direction flow") through the fluid branch 82.

Referring to FIGS. 1 and 2, as the operator of the vehicle depresses the brake pedal 14 and actuates the master cylinder 12, the pressure within the conduit 16 is increased. During normal braking, in which brake failure has not occurred, the simulator valve 28 is open and the isolation valves 22a and 22b are closed. Fluid flows through the dampening circuit 29 via the fluid branch 82 into the pedal simulator 26. As long as the pressure within the conduit 16 is less than the predetermined pressure which opens the relief valve 94, all of the fluid traveling through the dampening circuit 29 will be directed through the fluid branch 82. As the fluid travels through the restricted cross-sectional area of the orifice 90, the operator of the brake pedal will feel a resistance to this fluid movement. Of course, the operator of the vehicle will also feel a resistance force acting on the brake pedal 14 due to such factors as the compression of the spring 26e within the pedal simulator 26, and friction of the moving components of the brake system 2. The combination of the dampening circuit 29 and the pedal simulator 26, and the other factors mentioned above, create a pedal feel characteristic which can closely mimic that of a conventional brake system or other desired pedal feel.

If during brake apply the pressure within the conduit 16 is greater than the predetermined pressure which opens the relief valve 94, such as during a panic brake situation, the relief valve 94 will open, thereby allowing a greater amount of fluid to travel through the dampening circuit 29 in the apply direction.

Upon release of the brake pedal 14, the fluid will flow out of the pedal simulator 26 and through the dampening circuit 29 via the fluid branches 80 and 82. Unlike the case during brake apply, fluid flows through both the orifice 90 and the orifice 86. Thus, the pedal response felt by the operator is different in the brake release direction than in the brake apply direction.

For the brake apply direction, the pressure difference between the master cylinder 12 and the pedal simulator 26 depends upon the flow of fluid through the orifice 90 and possibly through the relief valve 94. For the brake release direction, the pressure difference between the master cylinder 12 and the pedal simulator 26 depends upon the flow through the orifices 86 and 90. The flow volume is related to the actuation speed of the brake pedal 14. Thus, the resistance characteristic is dependent on the actuation speed of the brake pedal as well as the pressure difference between the master cylinder 12 and the pedal simulator 26. The resistance characteristic can be altered by adjusting the predetermined pressure which opens the relief valve 94 and by adjusting the cross-sectional areas of the orifices 86 and 90. Preferably, the orifices 86 and 90 are sized or adjustable so that actuation of the brake pedal 14 (apply direction flow) creates more of a resistance than when the brake pedal 14 is released (release direction flow).

The total cross sectional area for apply direction flow through the branches 80 and 82 during normal brake apply situations (in which the relief valve 94 remains shut) is less than the cross sectional area for release direction flow. This has been found to be a significant factor to achieving a good pedal feel. Generally, a preferred ratio of cross section area for release flow to the cross sectional area for apply direction flow through the branches 80 and 82 has been found to be greater than unity (1:1) and less than about 10:1, and most preferably in the range of about 2:1 to 4:1.

As previously stated above, the fluid branch 84 includes the relief valve 94 which prevents the flow of fluid through the fluid branch 84 in the apply direction until a predetermined pressure is reached. When the predetermined pressure is reached, the relief valve 94 opens, thereby allowing fluid to travel through the fluid branch 84 in the apply direction. This serves to limit the pedal reaction force a driver of the vehicle experiences during a panic stop situation. The value of the suitable predetermined pressure is dependent upon the area of the working face of the piston in the master cylinder 12. If the working face area of the piston in the master cylinder is larger, for a given pressure seen at the master cylinder 12 as a result of pressure drop across the damping circuit 29, the reaction force on the brake pedal 14 is correspondingly larger. However, for vehicles such as light trucks and passenger cars, with the master cylinder 12 being of a size typically supplied on such vehicles, a preferred range (for good pedal feel) for the predetermined pressure setpoint for operating the relief valve 94 has been found to be from about 5 bar to about 30 bar.

Although FIG. 2 illustrates a specific example of a dampening circuit 29, it should be understood that any suitable configuration can be used.

There is also shown schematically in FIG. 2 an example of an expansion volume unit 31 which is in fluid communication with the pedal simulator 26. The expansion volume unit 31 preferably includes a flexible membrane disposed within a cylinder. The membrane is preferably made of an elastomeric material. As the brake pedal 14 is depressed, pressurized fluid from the master cylinder 12 is directed into the expansion volume unit 31, thereby expanding the membrane in an outwardly direction. Preferably, the membrane expands into a caged housing ultimately which limits the expansion of the membrane. As the membrane expands, the membrane provides increasing resistance to further expansion, resulting in a gradually increasing pressure in the conduit 16 as fluid flows from the master cylinder 12 into the expansion volume unit 31. This resistance to expansion is fed back to the brake pedal 14 through the increase in pressure of the conduit 26 reacting in the master cylinder 12, so that the operator of the brake pedal 14 feels an increased resistance. The membrane will continue to expand outwardly until the membrane expands to the boundaries of the caged member. The resistance force caused by the expansion of the membrane is dependent on the various design criteria of the expansion volume unit 31, such as the stiffness of the membrane material and the shape of the membrane and caged housing Although FIG. 2 illustrates a specific example of an expansion volume unit 31, it should be understood that any suitable configuration can be used. For example, the expansion volume unit can be designed without a caged housing, and instead include a sealed chamber. The sealed chamber can be filled with air or other suitable gases to provide for a reactionary spring force acting against the membrane. The sealed chamber can then be provided with a valve arrangement to seal air within the sealed chamber. The expansion volume unit 31 can also be provided with a mechanical spring element to supplement the force exerted by the membrane. In a preferred embodiment, the expansion volume unit includes a housing (not shown) defining a cylinder which is vented at first end (preferably to the reservoir 20, although the cylinder may be vented to atmosphere). The second end of the cylinder of the expansion volume unit is in fluid communication with the pedal simulator 26. A piston (not shown) is slideably disposed in the cylinder of the expansion volume unit and seals against the wall of the cylinder. A first end of the piston is in fluid communication with the pedal simulator 26. A spring (not shown) extends between a second end of the piston of the expansion volume unit, and a spring seat formed at the second (vented) end of the cylinder. A membrane is fixed to the first end of the piston with an air volume formed between the membrane and the first end of the piston. A vent hole is formed through the piston to vent the air volume to the second (vented) end of the cylinder. As pressure increases in the pedal simulator, the membrane in the expansion volume unit first distorts against the piston to collapse the air volume As pressure continues to rise, the piston in the expansion volume unit (which is relatively lightly spring-loaded compared to the piston of the pedal simulator 26) begins to move, compressing the spring of the expansion volume unit. As the piston in the expansion volume unit nears the end of travel, the pressure in the pedal simulator 26 rises to the pressure required for the piston in the pedal simulator 26 to begin moving. This arrangement, in a manner similar to the expansion volume unit 31, results in improved pedal feel, as will be explained below with reference to the illustrated expansion volume unit 31.

Figure 3:
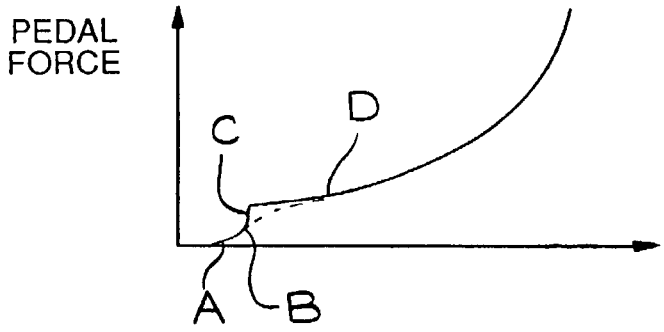
FIG. 3 is a graph of Pedal Force vs. Pedal Travel for an electro-hydraulic brake system having an expansion volume unit and for an electro-hydraulic brake system not having an expansion volume unit.

The expansion volume unit 31 provides for improved pedal feel during initial stroke movement of the brake pedal 14. FIG. 3 is a graph which plots the input force acting on the pedal 14 by the operator of the vehicle (Pedal Force) vs. the travel length or stroke of the brake pedal 14 (Pedal Travel). The plot for a typical electro-hydraulic brake system without an expansion volume unit 31 is shown in a solid line. The plot for an electro-hydraulic brake system with an expansion volume unit 31 is shown in broken line.

Referring now to the solid line plot for a typical electro-hydraulic brake system without an expansion volume unit 31, the initial stroke of the brake pedal 14, labeled "A" in FIG. 3, involves taking up the slack in the mechanical pedal linkages. For a conventional master cylinder having compensation ports, the initial stroke "A" of the brake pedal 14 also involves the movement of the pistons within the master cylinder 12 prior to the closing of the compensation ports by the piston seals. During the closing of the compensation ports, indicated by the reference letter "B", the pedal force increases relatively rapidly over a relatively small pedal travel distance. The static friction of the piston of the pedal simulator 26 and the preload of the spring 26e of the pedal simulator 26 cause a generally rapid rise in pedal force with little or no pedal travel, as indicated by the reference letter "C". Once the static friction and spring preload of the pedal simulator are overcome and the piston 26c in the pedal simulator 26 begins to move (break-free pressure), continued movement of the brake pedal 14 results in the characteristic curve of the piston/spring arrangement of the pedal simulator 26, as indicated by the reference letter "D".

The expansion of the membrane of the expansion volume unit 31 provides a resistance which is felt by the operator of the brake pedal 14. Preferably, the expansion volume unit 31 is designed so that the operator of the brake pedal 14 feels this gradually increasing resistance during the beginning stages of brake pedal movement as the compensating ports close on the master cylinder 12 and pressure rises to the break-free pressure to get the pedal simulator piston 26c moving, thereby increasing the pedal travel required for a given pressure rise, and "smoothing" the Pedal Force vs. Pedal Travel curve, such as that indicated by the broken line of FIG. 3.

Note that the dampening circuit 29 and the expansion volume unit 31 are preferably both included in the brake systems [of the present invention] *described herein*. However, it is contemplated that either or both of the dampening circuit 29 and the expansion volume unit 31 can be suitably omitted. The expansion volume unit 31 can also be designed to provide a progressively larger resistance to movement throughout the pedal stroke, thereby acting as a pedal simulator and eliminating the need for the pedal simulator 14 from the brake system.

Figure 4:
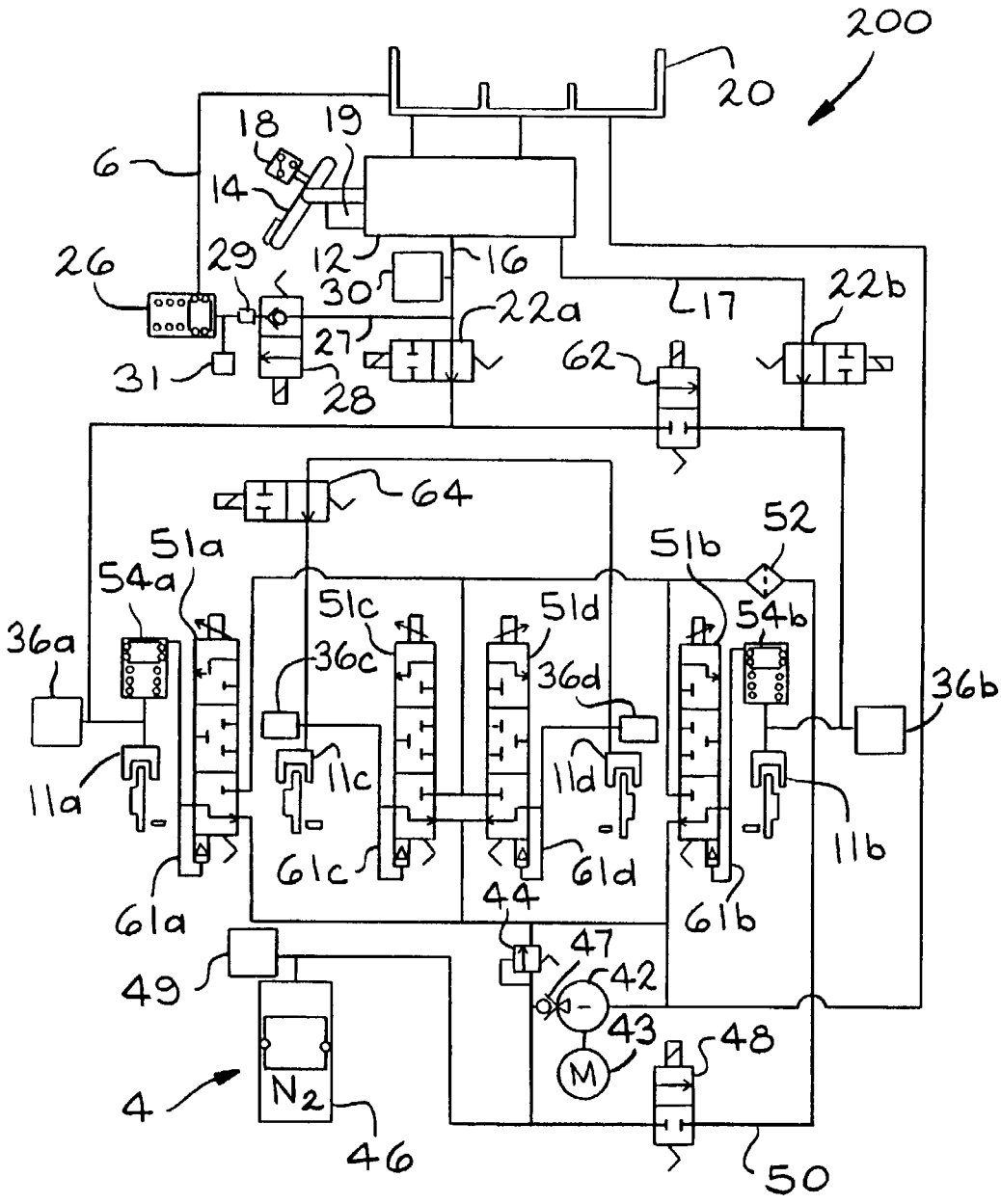
FIG. 4 is a schematic view of a second embodiment of a vehicle brake system

FIG. 4 is a schematic view illustration of another vehicle brake system, indicated generally at 200, according to the present invention. The components of the brake system 200, and their function, are in many instances identical in function and structure to the components disclosed in the above embodiment of the brake system 2 shown in FIG. 1. Such components will be referred to using the same reference numbers as in the brake system 2. Unless otherwise indicated, where a similarly numbered component is shown in FIG. 4 but not specifically discussed, its function and structure may be taken to be similar to that of the similarly numbered component of the brake system 2 of FIG. 1. Similarly, if a component is discussed or implied and not specifically shown, its structure and function may also be taken to be similar to the previously disclosed, similarly situated component of FIG. 1.

The vehicle brake system 200 may suitably be used on an automotive vehicle having four wheels and a brake for each wheel. [This invention provides] *The vehicle brake system 200 is* an electronically controlled brake system for the four wheels with manual backup braking to two of the vehicle brakes 11a and 11b. One of the differences between the brake systems 2 and 200, is that the balance valve 62 provides communication between the vehicle brakes 11a and 11b instead of communications between the outlets of the pressure control valves 51a and 51b. Thus, the balance valve 62 of the brake system 200 is hydraulically connected on the other side of the fluid separator units 54a and 54b from the balance valve 62 in the vehicle brake system 2. This arrangement presents different testing capabilities for the control module 10 by permitting direct cross connection of the wheel brake 11a and the pressure transducer 36a with the other front wheel brake 11b and the pressure transducer 36b, for example.

Figure 5:
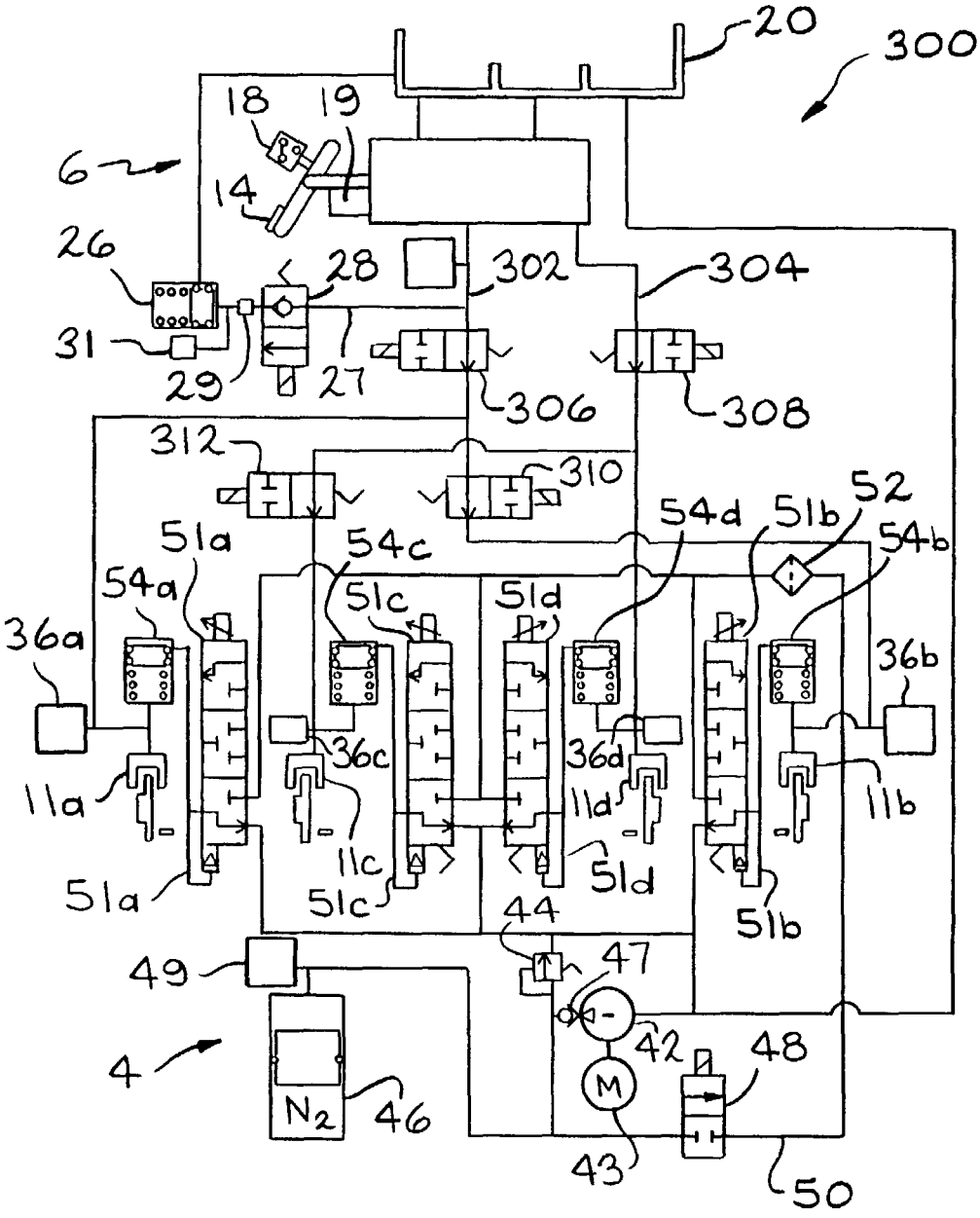
FIG. 5 is a schematic view of a third embodiment of a vehicle brake system.

FIG. 5 is a schematic view illustration of another vehicle brake system, indicated generally at 300, according to the present invention. The components of the brake system 300, and their function, are in many instances identical in function and structure to the components disclosed in the above embodiments of the brake systems 2 and 200 as shown in FIGS. 1 and 4, respectively. Such components will be referred to using the same reference numbers as in the brake systems 2 and 200. Unless otherwise indicated, where a similarly numbered component is shown in FIG. 5 but not specifically discussed, its function and structure may be taken to be similar to that of the similarly numbered component of the brake systems 2 or 200. Similarly, if a component is discussed or implied and not specifically shown, its structure and function may also be taken to be similar to the previously disclosed, similarly situated component of FIG. 1 or FIG. 4.

The vehicle brake system 300 may suitably be used on an automotive vehicle having four wheels and a brake for each wheel. One of the differences between the brake systems 2 and 300 is that the brake system 300 is an electronically controlled brake system for the four wheels with manual backup for all four of the vehicle brakes 11a, b, c, and d. The brake system 300 includes a primary circuit conduit 302 which is in fluid communication with the vehicle brakes 11a and 11b through an isolation valve 306. The brake system 300 also includes a secondary circuit conduit 304 which is in fluid communication with the vehicle brakes 11c and 11d through an isolation valve 308. The brake system 300 further includes a balance valve 310 which selectively isolates the fluid communication between the vehicle brakes 11a and 11b. A balance valve 312 selectively isolates the fluid communication between the vehicle brakes 11c and 11d. The brake system 300 also includes four fluid separator units 54a, b, c, and d, positioned between the proportional control valves 5a, b, c, and d and the vehicle brakes 11a, b, c, and d, respectively.

If desired, the brake systems 200 and 300 can further include a suitable dampening circuit 29 and a suitable expansion volume unit 31, either separately or in combination.

FIG. 6 illustrates a specific embodiment of the master cylinder 12 and the pedal simulator 26 which can be used in the brake systems 2, 200, and 300 of the present invention. The master cylinder 12 is a tandem master cylinder, having two service pistons 12a and 12b. The master cylinder 12 is in fluid communication with the pedal simulator 26 via a conduit, such as the conduit 16. The isolation valve, indicated by the block 28, is located within the conduit 16 between, and thus in fluid communication with the master cylinder 12 and the pedal simulator 26. The optional dampening circuit, indicated by the block 29, is also shown in fluid communication with the pedal simulator via the conduit 16. Although not shown, the expansion volume unit 31 is preferably also in fluid communication with the pedal simulator 26 through the conduit 16.

FIG. 10 is a schematic view illustration of a vehicle brake system, according to the present invention, which is indicated generally at 350. Many of the components of the brake system 350 are similar to the components disclosed in the brake systems 2, 200, and 300, and function in a similar manner. Such components will be assigned the same reference numbers as in the previous brake systems 2, 200, and 300. Where a component is shown in FIG. 10 but not specifically discussed, its function and structure may be taken to be similar to that of components similarly situated in the brake systems 2, 200, and 300. Similarly, if a component is discussed or implied and not specifically shown, its existence and function may also be taken to be similar to the previously disclosed similarly situated components.

The vehicle brake system 350 may suitably be used on an automotive vehicle having four wheels and a brake for each wheel. The vehicle brake system 350 is comprised of two separate brake systems, a front brake system shown generally at [351] *352* and a rear brake system shown generally at 354. The front brake system [351] *352* is comprised of two subsystems: an electrically powered front brake system which includes a motor operated, electronically controlled normal source of pressurized brake fluid 4; and a manual supply of pressurized hydraulic brake fluid, embodied as a master cylinder 12. The rear brake system 354 is comprised of two electronically controlled power cylinders 210 and 212 for supplying pressurized hydraulic brake fluid to individual wheel brake units. The power cylinder 210 uses a linear actuator 214 to drive a spring loaded piston 218 a controlled distance into a cylinder 226. The operation of the power cylinder 210 is controlled by the control module. The cylinder 226 is filled with hydraulic brake fluid, which may be pressurized and urged from the cylinder 226 of the power cylinder 210 into the brake unit 11d to generate a controlled amount of braking force with the vehicle brake 11d. The linear actuator 214 may be any suitable device for accurately controlling the position of the piston 218 with respect to the cylinder 226. A pressure transducer 222 provides a signal to the control module representative of the pressure developed by the power cylinder 210. Preferably, this pressure signal is used by the control module as a pressure feedback loop for controlling the operation of the power cylinder 210. The control module can modulate the pressure by positioning the linear actuator 214 of the power cylinder 210. The power cylinder brake unit 212 is preferably identical in configuration to the power cylinder brake unit 210. The power cylinder 212 uses a linear actuator 216 controlled by the control module to drive a piston 220 a controlled distance into a cylinder 228. The cylinder 228 is filled with hydraulic brake fluid, to selectively effect a controlled amount of braking force in the vehicle brake 11c. The linear actuator 216 may be any suitable device for accurately controlling the position of the piston 220 with respect to the cylinder 228. The pressure transducer 224 provides a pressure feedback signal to the control module representative of the pressure developed by the power cylinder 212. Preferably, this pressure signal is used by the control module as a pressure feedback loop for controlling the operation of the power cylinder 212. The control module can modulate the pressure by positioning the linear actuator 216 of the power cylinder 212.

The front brake system [351] *352* of the present invention differs from the front brake units disclosed above, in that there is a single proportional control valve 51 that controls the hydraulic brake fluid pressure to both front vehicle brakes 11a and 11b. The hydraulic brake fluid is then selectively applied to the vehicle brakes 11a and 11b through electrically operated solenoid isolation valves 70a, 70b, 72a, and 72b, as will be described below. Additionally, a pressure isolation valve 348 is provided which acts to isolate only the accumulator 46 and not the pump 42. Suitable overpressure protection (not shown) should be provided for the accumulator 46. The pressure transducer 49 reflects the discharge pressure of the pump only when the discharge pressure is at least as high as the pressure in the accumulator 46 when the pressure isolation valve 348 is shut. However the pressure isolation valve 348 is energized open during normal braking, enabling the pressure transducer 49 to reflect the pressure of the hydraulic brake fluid being supplied to the proportional control valve 51.

Note that two damping circuits 29 are provided, one for each of two pedal simulator 26a and 26b connected, respectively to the conduits 16 and 17 out of the master cylinder 12. Only one expansion volume unit 31 is shown, in fluid communication with the pedal simulator 26a. If desired, an expansion volume unit 31 could be provided in fluid communication with the pedal simulator 26b.

Referring to FIG. 10, the normal source of pressurized hydraulic brake fluid to the front vehicle brakes 11a and 11b is shown generally at 4. A proportional control valve 51 modulates the pressure of the hydraulic brake fluid provided to vehicle brakes 11a and 11b according to instructions received from a control module (not shown). The hydraulic brake fluid is supplied to the vehicle brakes 11a and 11b through electrically operated isolation valves 70a and 70b, respectively. During normal operation, the isolation valves 70a and 70b are de-energized and in the open position, as shown in FIG. 10. The isolation valves 70a and 70b thereby allow passage of the hydraulic brake fluid from the proportional control valve 51 to the fluid separator units 54a and 54b. The fluid separator units 54a and 54b function identically to the fluid separator units in the brake system 2, in that the fluid separator units 54a and 54b prevent the hydraulic brake fluids of the normal source 4 and the backup source 6 from mixing, thereby preventing a leak from the piping of the normal source 4 from disabling the backup source 6 of hydraulic brake fluid, while allowing pressure from the normal source of pressurized hydraulic brake fluid 4 to be operatively hydraulically connected to the vehicle brakes 11a and 11b. The proportional control valve 51 controls the pressure of the hydraulic brake fluid to be supplied to the vehicle brakes 11a and 11b for foundation braking. In response to various driver demands, as signaled by the pressure sensed at the pressure transducers 30 and 32, the proportional control valve 51 will be positioned to apply pressurized fluid to the vehicle brakes 11a and 11b, to hold pressure on the brakes 11a and 11b, or to vent pressure from the brakes 11a and 11b. Only the one pressure control valve 51 is used to control the pressure for both of the brakes 11a and 11b. Such an arrangement may prove to be less expensive than a separate proportional control valve 51 for each of the brakes 11a and 11b of the brake system 2, for example.

The isolation valves 70a and 70b cooperate with the dump valves 72a and 72b to provide digital brake control for antilock braking, vehicle stability control, or traction control functions. For example, a traction control scenario might involve, in a front-wheel drive vehicle, a left front wheel which is losing traction during heavy acceleration. In such a situation, it may be desired to apply the brake 11a, while not applying the brake 11b. To accomplish this, the isolation valve 70b is shut while the isolation valve 70a remains open. The pressure isolation valve 348 is opened, and pressurized hydraulic brake fluid from the accumulator 46 is regulated by the pressure control valve 51 to a desired pressure. The pressurized hydraulic brake fluid is blocked from being applied to the brake 11b by the isolation valve 70b, but is allowed, by the open valve 70a to actuate the brake 11a, slowing the individual wheel until the associated wheel slows and regains traction. The dump valve 72a can then be opened, or the control valve 51 can then be deenergized, or both, to bleed pressure from the brake 11a back to the reservoir 40, as directed by the control module. The pressure isolation valve 348 is then shut, and the pump 42 stopped, if the pump 42 was running.

Other control schemes may also be suitably used. For example, if both front wheels were slipping under acceleration, but not at the same rate, both the isolation valves 70a and 70b may be shut, the proportional control valve 51 opened to regulate pressure higher than is to be needed at either wheel, and then the isolation valves 70a and 70b pulsed open to achieve independently controlled pressures needed to slow down the respective wheel. The braking force at each wheel would be controlled by cooperative modulation of the respective isolation valves 70a and 70b, and the dump valves 72a and 72b. In another control arrangement which is contemplated, the isolation valves 70a and 70b would not be initially closed, but would be closed when the associated wheel began to slow, or when the desired brake pressure was reached. In yet another control scheme which is contemplated, the proportional control valve 51 would modulate pressure in the brakes as needed to achieve the pressure needed for both of the brakes 11a and 11b, with both the isolation valves 70a and 70b remaining open at all times, and both of the dump valves 72a and 72b remaining shut. This would be simple control, but may result in a brake 11a or 11b which did not need as high a brake pressure as the other of the brakes 11a and 11b being braked with greater pressure than needed to prevent wheel spin. Therefore it is also contemplated that the proportional control valve 51 would be modulated to control the wheel spin on the wheel operating on the surface with the lower coefficient of friction, while the isolation valves 70a or 70b and the dump valves 72a or 72b would be modulated to control the brake pressure of the other wheel, on a surface with higher coefficient of friction, at the appropriate lower pressure needed to stop the wheel spin. Thus it is apparent that the arrangement of the brake system 350 provides for great flexibility in a traction control situation. The same is true in other braking situations, such as when antilock braking is required.

As an example, if a need was detected for pulsing the vehicle brakes 11a and b such as would be required to prevent locking up the brakes, or for braking in slippery road conditions, the isolation valves 70a and 70b and the dump valves 72a and 72b could be pulsed open and closed. The digital (either on or off) nature of control of the isolation valves 70a and 70b and the dump valves 72a and 72b allows the isolation valves 70a and 70b and the dump valves 72a and 72b to cooperate to rapidly increase, decrease, or hold pressure for antilock braking. Other non-modulated or digital applications of the front brake system 351 could be effected as needed with the arrangement of the isolation and dump valves 70a, 70b, 72a, and 72b as shown. Note that it is anticipated that the isolation valves 70a and 70b and the dump valves 72a and 72b may be suitably constructed to provide proportional control of hydraulic brake fluid passing through the respective valve, thereby permitting finer control of the hydraulic pressure in the brakes 11a and 11b. For example, the isolation valves 70a and 70b may be constructed to enable the valve to operate in a stable manner when the valve is partially open, allowing a more gradual pressure rise in the associated brake 11a and 11b, which may be desired if the wheel is near lock-up. The dump valves 72a and 72b could similarly be constructed to modulate flow of hydraulic brake fluid therethrough.

As in the previous embodiments of the brake system 2, 200 and 300, upon failure of the normal source of pressurized hydraulic brake fluid 4 to the vehicle brakes 11a and 11b, or upon failure of the control module, the backup source 6 of pressurized hydraulic brake fluid supplied by the master cylinder 12, will be an available source of pressurized hydraulic brake fluid to be applied to the brakes of the brake system 350, preferably to the front brakes 11a and 11b as illustrated in FIG. 10. The vehicle brakes 11a and 11b supplied by the master cylinder 12 can be designed to provide sufficient braking force to safely operate the vehicle with the pressure supplied from the master cylinder 12. Of course, although not illustrated in FIG. 10, it is contemplated that the master cylinder 12 can be operatively connected to selectively supply pressurized hydraulic brake fluid to the power cylinders 210 and 212, if desired. It is also contemplated that separate power supplies may by used to power the motors of the power cylinders 210 and 212 to provide an additional level of redundancy and safety to the brake system 350. Of course redundant, independently powered, and cross-checking control modules may be utilized to control the operation of the power cylinders 210 and 212, and of the proportional control [valves 51a and 51b] *valve 51*. It is also contemplated that all four of the vehicle brakes 11a, b, c, and d could be supplied from a respective power cylinder similar to the power cylinder 210. The backup source 6 could be connected to two or four of the vehicle brakes 11a, b, c, and d. A suitable fluid separator unit 54a is preferably provided between the power cylinder and the connection of the backup source 6 in communication with the vehicle brakes 11a, b, c, and d.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A brake system comprising:

a normal source of pressurized hydraulic brake fluid;

a backup source of pressurized hydraulic brake fluid;

a vehicle brake which is operated by application of pressurized hydraulic brake fluid thereto;

a valve for selectively preventing the flow of hydraulic brake fluid between the backup source and said vehicle brake;

*a fluid conduit in fluid communication with said backup source;*

*a pedal simulator in fluid communication with said backup source via said fluid conduit, said pedal simulator including a spring and a piston acting to compress said spring under the influence of pressurized hydraulic fluid from said backup source exceeding a first pressure;* and a fluid separator unit for maintaining the integrity of said backup source of pressurized fluid and preventing intermixing of the hydraulic brake fluid of said normal source and the hydraulic brake fluid of said backup source and having a movable pressure boundary which enables, through movement thereof, said normal source of pressurized hydraulic brake fluid to selectively act upon said vehicle brake via a portion of said backup source when said valve is shut.

2. The brake system of claim 1, further including a brake system brake demand detection arrangement comprising:

a manually operated master cylinder *comprising at least a portion of said backup source*;

[a] *said* fluid conduit *being* in fluid communication with said master cylinder;

[a pedal simulator in fluid communication with said master cylinder via said fluid conduit, said pedal simulator including a spring and a piston acting to compress said spring under the influence of pressurized hydraulic fluid from said master cylinder exceeding a first pressure;]

a pressure transducer generating a signal representative of the pressure of said fluid flowing between said master cylinder and said pedal simulator; and an expansion volume unit in fluid communication with said master cylinder and said pedal simulator via said fluid conduit, said expansion volume unit permitting fluid to flow from said master cylinder into said expansion volume unit when said fluid exceeds a second pressure less than said first pressure.

3. The brake system of claim 2 wherein said pedal simulator further includes a housing defining a bore having a first end adapted to be connected in fluid communication with said backup source, said bore further having a second end, said piston being slidably disposed in said bore and having a first face and a second face, said spring engaging said second face of said piston and acting between said piston and a portion of said housing to urge said first face of said piston toward said first end of said bore, and a damping circuit hydraulically interposed between said first end of said bore and said backup source to present a first cross sectional flow area to fluid flowing from said backup source through said damping circuit into said housing, and presenting a second cross sectional flow area to fluid flowing from said housing through said damping circuit, the ratio of said second cross sectional flow area to said first cross sectional flow area being greater than unity.

4. The brake system of claim 3 wherein said ratio is less than 10:1.

5. The brake system of claim 4 wherein said ratio is in the range of 2:1 to 4:1.

6. The brake system of claim 3 further including a relief valve opening above a predetermined pressure to permit fluid flow through said relief valve from said brake system to said housing.

7. The brake system of claim 6 wherein said predetermined pressure is in the range of about 5 bar to about 30 bar.

8. The brake system of claim 3 further including a relief valve opening above a predetermined pressure to permit fluid flow through said relief valve from said brake system to said housing.

9. The brake system of claim 8 wherein said predetermined pressure is in the range of about 5 bar to about 30 bar.

10. The brake system of claim 2 wherein said fluid separator unit has a housing defining a cylinder bore and a piston slideably disposed therein, said piston having a first working face in fluid communication with said normal source and a second working face in fluid communication with said backup source, said first and second working faces having substantially similar areas.

11. The brake system of claim 2, further including:

a brake pedal for operating said master cylinder;

a pedal travel sensor for generating a stroke signal representative of the stroke of said brake pedal;

said signal from said pressure transducer being related to the brake application force applied by a driver to said brake pedal; *and* a control unit responsive to a demand signal for controlling said brake system actuator, said demand signal being generated as a blended function of both said stroke signal and said signal from said pressure transducer wherein, during an initial movement of said brake pedal, said stroke signal is weighted greater than said signal from said pressure transducer, and wherein, during a subsequent movement of said brake pedal, said signal from said pressure transducer is weighted greater than said stroke signal.

12. The brake system of claim 1 [further including a pedal simulator], said pedal simulator comprising:

a housing defining a bore having a first end adapted to be connected in fluid communication with said backup source, said bore further having a second end;

[a] *said* piston *being* slidably disposed in said bore and having a first face and a second face;

[a] *said* spring engaging said second face of said piston and acting between said piston and a portion of said housing to urge said first face of said piston toward said first end of said bore; and a damping circuit hydraulically interposed between said first end of said bore and said backup source to present a first cross sectional flow area to fluid flowing from said backup source through said damping circuit into said housing, and presenting a second cross sectional flow area to fluid flowing from said housing through said damping circuit, the ratio of said second cross sectional flow area to said first cross sectional flow area being greater than unity.

13. The brake system of claim 12 wherein said ratio is less than 10:1.

14. The brake system of claim 13 wherein said ratio is in the range of 2:1 to 4:1.

15. The brake system of claim 12 further including a relief valve opening above a predetermined pressure to permit fluid flow through said relief valve from said brake system to said housing.

16. The brake system of claim 15 wherein said predetermined pressure is in the range of about 5 bar to about 30 bar.

17. The brake system of claim 1 wherein said fluid separator unit has a housing defining a cylinder bore [and a], *said* piston *being* slideably disposed therein, said piston having a first working face in fluid communication with said normal source and a second working face in fluid communication with said backup source, said first and second working faces having substantially similar areas.

18. A brake system comprising:

a brake pedal for operating a brake system actuator;

a pedal travel sensor for generating a stroke signal representative of the stroke of said brake pedal;

a brake system sensor for generating a force signal representative of the brake application force applied by a driver to said brake pedal;

a control unit responsive to a demand signal for controlling said brake system actuator, said demand signal being generated as a blended function of both said stroke, signal and said force signal wherein, during a first part of the stroke of said brake pedal, said stroke signal is weighted greater than said force signal, and wherein, during a second part of the stoke of said brake pedal, said force signal is weighted greater than said stroke signal.

19. An electro-hydraulic brake system comprising:

a reservoir of hydraulic brake fluid;

a pump having a suction port and a discharge port, said suction port being connected in fluid communication with said reservoir;

a first fluid conduit being connected in fluid communication with said discharge port of said pump;

a fluid separator unit having a housing with a bore defined therethrough, said bore having a first end and a second end, said first end of said bore being connected in fluid communication with said discharge port of said pump via said first fluid conduit, said fluid separator unit further including a piston slidingly disposed in said bore and a spring disposed to urge said piston toward said first end of said bore;

a second fluid conduit connected in fluid communication with said second end of said fluid separator unit;

a vehicle brake connected in fluid communication with said second end of said fluid separator unit via said second fluid conduit;

a third fluid conduit connected in fluid communication with said vehicle brake;

a hydraulic master cylinder connected in fluid communication with said vehicle brake via said third fluid conduit;

an electrically-operated valve disposed in said third fluid conduit, said valve preventing the flow of hydraulic brake fluid between said master cylinder and said vehicle brake when closed, said valve being open to permit the flow of hydraulic brake fluid between said master cylinder and said vehicle brake when said valve is electrically deenergized;

a fourth fluid conduit connected in fluid communication with said master cylinder and said third fluid conduit;

a pedal simulator connected in fluid communication with said master cylinder via said fourth fluid conduit;

an second electrically-operated valve disposed in said fourth fluid conduit, said second valve being closed to prevent the flow of hydraulic brake fluid between said master cylinder and said pedal simulator when said second valve is deenergized, said second valve permitting the flow of hydraulic brake fluid between said master cylinder and said pedal simulator when said second valve is open; and a damping circuit hydraulically interposed between said master cylinder and said pedal simulator, said damping circuit comprising, in parallel flow paths, an orifice and a check valve such that said damping circuit presents a first cross sectional flow area to fluid flowing from said master cylinder through said damping circuit into said pedal simulator, and presenting a second cross sectional flow area, different from said first cross sectional flow area, to fluid flowing from said pedal simulator to said master cylinder through said damping circuit.

20. The electro-hydraulic brake system of claim 19 further including a third electrically-operated valve disposed in said first fluid conduit, said third valve preventing fluid communication between said pump and said fluid separator unit when said third valve is closed, said third valve permitting fluid communication between said pump and said fluid separator unit when said third valve is open, the electro-hydraulic brake system further including fifth fluid conduit having a first end connected in fluid communication with said first fluid conduit and said fluid separator unit and having a second connected in fluid communication with said reservoir, the electro-hydraulic brake system further including a fourth electrically-operated valve disposed in said fifth fluid conduit, said fourth valve preventing fluid communication between said fluid separator unit and said reservoir when said fourth valve is closed, said fourth valve permitting fluid communication between said fluid separator unit and said reservoir when said fourth valve is open.

*21. A hydraulic brake system for a vehicle comprising:*

*wheel brakes for four wheels, in which the wheels are distributed with a first and a second wheel brake on a first vehicle axle and a third and a fourth wheel brake on a second vehicle axle;*

*a normal hydraulic energy source, having electrically controllable brake valve devices disposed between said energy source and said wheel brakes;*

*a brake pedal;*

*a sensor generating a first signal indicative of the position of said brake pedal;*

*a second sensor generating a second signal indicative of the force exerted by a driver on said brake pedal;*

*a master cylinder supplying two brake circuits, said master cylinder being actuated by said brake pedal and being intended for carrying out a backup brake operation by muscle-powered energy via said brake pedal, each brake circuit being in fluid communication with a respective one of said first and second wheel brakes;*

*a respective normally open isolation valve being disposed between said master cylinder and said wheel brakes in each of said two brake circuits, each of said isolation valves being switched into a closed position when said wheel brakes are supplied with fluid from said normal hydraulic energy source;*

*a respective fluid separator unit being interposed between each of said first and second wheel brakes of said first vehicle axle and an associated one of the electrically controllable brake valve devices, said fluid separator units having movable components forming a pressure boundary that enables said normal source to selectively act upon said vehicle brake via a portion of said backup source, said first and second wheel brakes being connected to a respective one of said isolation valves associated with said two brake circuits of said master cylinder; and*

*a control unit for controlling said normal hydraulic energy source and said isolation valves, said control unit responding as a blended function of both said first signal and said second signal, with the contribution of the second signal relative to the first signal generally varying as a function of the first signal.*

*22. The hydraulic brake system of claim 18, further comprising:*

*wheel brakes for two wheels, in which the wheels are distributed at each end of a front vehicle axle;*

*a normal source of pressurized hydraulic brake fluid, having electrically controllable brake valve devices disposed between said normal source and said wheel brakes,*

*a master cylinder comprising at least a portion of said brake system actuator and supplying two brake circuits, said master cylinder being actuated by said brake pedal and being intended for carrying out a backup brake operation by muscle-powered energy via said brake pedal, each of said brake circuits being in fluid communication with a respective one of said wheel brakes; and*

*a respective normally open isolation valve being disposed between said master cylinder and said respective one of said wheel brakes in each brake circuit, each of said isolation valves being electrically switched into a closed position when said wheel brakes are supplied with fluid from said normal source, and wherein at least the electrically controllable brake valve devices are controlled by said control unit.*

*23. The hydraulic brake system of claim 22, said normal source including a motor driven pump for pumping hydraulic brake fluid from a reservoir, wherein said electrically controllable brake valve devices are arranged to block a respective flow path from said normal source to said wheel brakes and to open a respective flow path from said wheel brakes to said reservoir when no braking is being demanded.*

*24. The hydraulic brake system of claim 22, said normal source including a motor driven pump for pumping hydraulic brake fluid from a reservoir, wherein said electrically controllable brake valve devices are arranged to block a respective flow path from said normal source to said wheel brakes and to open a respective flow path from said wheel brakes to said reservoir when no braking is being demanded.*

*25. The brake system of claim 18, further comprising:*

*an axle of a vehicle;*

*a first wheel brake mounted on said axle;*

*a second wheel brake mounted on said axle;*

*a normal source of pressurized hydraulic brake fluid adapted to selectively supply hydraulic brake fluid to said first wheel brake and said second wheel brake;*

*a backup source of pressurized hydraulic brake fluid comprising a master cylinder;*

*a first backup fluid conduit extending between said master cylinder and said first wheel brake to selectively provide fluid communication between said backup source and said first wheel brake; and*

*a second backup fluid conduit extending between said master cylinder and said second wheel brake to selectively provide fluid communication between said backup source and said second wheel brake.*

*26. The hydraulic brake system of claim 25, wherein said normal source is under the control of said control unit.*

*27. The brake system of claim 18, further comprising:*

*wheel brakes for two wheels, in which the wheels are distributed at each end of a front vehicle axle;*

*a normal source of pressurized hydraulic brake fluid, having electrically controllable brake valve devices dis-*

*posed between said normal source and said wheel brakes, said electrically controllable brake valve devices being controlled by a control unit in response to a braking demand signal;*

*a master cylinder supplying two brake circuits, said master cylinder being actuated by said brake pedal and being intended for carrying out a backup brake operation by muscle-powered energy via said brake pedal, each of said brake circuits being in fluid communication with a respective one of said wheel brakes; and*

*a respective normally open isolation valve being disposed between said master cylinder and said respective one of said wheel brakes in each brake circuit, each of said isolation valves being electrically switched into a closed position when said wheel brakes are supplied with fluid from said normal source.*

*28. The hydraulic brake system of claim 27, said normal source including a motor driven pump for pumping hydraulic brake fluid from a reservoir, wherein said electrically controllable brake valve devices are arranged to block a respective flow path from said normal source to said wheel brakes and to open a respective flow path from said wheel brakes to said reservoir when no braking is being demanded.*

*29. The hydraulic brake system of claim 18, further comprising:*

*wheel brakes for two wheels, in which the wheels are distributed at each end of a front vehicle axle;*

*a hydraulic fluid reservoir;*

*a normal source of pressurized hydraulic brake fluid, having a motor-driven pump for pumping hydraulic brake fluid from said reservoir;*

*a master cylinder comprising at least a portion of said brake system actuator and supplying two brake circuits, said master cylinder being actuated by said brake pedal and being intended for carrying out a backup brake operation by muscle-powered energy via said brake pedal, each of said brake circuits being in fluid communication with a respective one of said wheel brakes; and*

*a respective electrically controllable brake valve device associated with each of said wheel brakes, said electrically controllable brake valve devices being arranged to block a respective flow path from said normal source to said wheel brakes and to open a respective flow path from said wheel brakes to said reservoir when no braking is being demanded.*

*30. The brake system of claim 18, further comprising:*

*wheel brakes for four wheels, in which the wheels are distributed with a first and second wheel brake on a first vehicle axle and a third and a fourth wheel brake on a second vehicle axle;*

*a normal hydraulic energy source, having electrically controllable brake valve devices disposed between said energy source and said wheel brakes;*

*said brake system sensor actuated by said brake pedal, for carrying out brake operations by operation of the electrically controllable brake valve devices;*

*a master cylinder supplying two brake circuits, said master cylinder being actuated by said brake pedal and being intended for carrying out a backup brake operation by muscle-powered energy via said brake pedal, each brake circuit being in fluid communication with at least one of said wheel brakes;*

*a respective normally open isolation valve being disposed between said master cylinder and said wheel brakes in each of said two brake circuits, each of said isolation valves being switched into a closed position when said wheel brakes are supplied with fluid from said normal hydraulic energy source, and wherein at least the electrically controllable brake valve devices are controlled by a control unit; and*

*a respective fluid separator unit being interposed between each of said first and second wheel brakes of said first vehicle axle and an associated one of the electrically controllable brake valve devices, said first and second wheel brakes being connected to a respective one of said isolation valves associated with said two brake circuits of said master cylinder.*

*31. The brake system of claim 18, further comprising:*

*wheel brakes for two wheels, in which the wheels are distributed at each end of a front vehicle axle;*

*a hydraulic fluid reservoir;*

*a normal source of pressurized hydraulic brake fluid, having a motor-driven pump for pumping hydraulic brake fluid from said reservoir;*

*a master cylinder supplying two brake circuits, said master cylinder being actuated by said brake pedal and being intended for carrying out a backup brake operation by muscle-powered energy via said brake pedal, each of said brake circuits being in fluid communication with a respective one of said wheel brakes; and*

*a respective electrically controllable brake valve device associated with each of said wheel brakes, said electrically controllable brake valve devices being arranged to block a respective flow path from said normal source to said wheel brakes and to open a respective flow path from said wheel brakes to said reservoir when no braking is being demanded.*

*32. The brake system of claim 1, further comprising:*

*a second vehicle brake, each of said vehicle brake and said second vehicle brake comprising respective wheel brakes for two wheels, in which the wheels are distributed at each end of a front vehicle axle;*

*electrically controllable brake valve devices disposed between said normal source and said wheel brakes, said electrically controllable brake valve devices being controlled by a control unit in response to a braking demand signal;*

*a brake pedal;*

*said backup source comprising a master cylinder supplying two brake circuits, said master cylinder being actuated by said brake pedal and being intended for carrying out a backup brake operation by muscle-powered energy via said brake pedal, each of said brake circuits being in fluid communication with a respective one of said wheel brakes; and*

*a respective normally open isolation valve being disposed between said master cylinder and said respective one of said wheel brakes in each brake circuit, each of said isolation valves being electrically switched into a closed position when said wheel brakes are supplied with fluid from said normal source, one of said normally open isolation valves comprising said valve for selectively preventing the flow of hydraulic brake fluid between the backup source and said vehicle brake.*

*33. The brake system of claim 32, said normal source including a motor driven pump for pumping hydraulic brake fluid from a reservoir, wherein said electrically controllable brake valve devices are arranged to block a respective flow path from said normal source to said wheel brakes and to open a respective flow path from said wheel brakes to said reservoir when no braking is being demanded.*

*34. The brake system of claim 1, further comprising:*

*a second vehicle brake, said vehicle brake and said second vehicle brake being mounted on an axle of a vehicle, said*

*normal source of pressurized hydraulic brake fluid adapted to selectively supply hydraulic brake fluid to said vehicle brake and said second vehicle brake, said backup source of pressurized hydraulic brake fluid comprising a master cylinder;*

*a first backup fluid conduit extending between said master cylinder and said first vehicle brake to selectively provide fluid communication between said backup source and said first vehicle brake; and*

*a second backup fluid conduit extending between said master cylinder and said second vehicle brake to selectively provide fluid communication between said backup source and said second vehicle brake.*

*35. The brake system of claim 1, further comprising:*

*a second vehicle brake, said vehicle brake and said second vehicle brake distributed on a first vehicle axle;*

*a third and a fourth vehicle brake on a second vehicle axle;*

*electrically controllable brake valve devices disposed between said normal source of pressurized hydraulic brake fluid and said vehicle brakes;*

*a brake pedal;*

*a first brake system sensor that is actuated by said brake pedal, for carrying out brake operations by operation of the electrically controllable brake valve devices;*

*a master cylinder supplying two brake circuits, said master cylinder being actuated by said brake pedal and being intended for carrying out a backup brake operation by muscle-powered energy via said brake pedal, each brake circuit being in fluid communication with at least one of said vehicle brakes;*

*a respective normally open isolation valve being disposed between said master cylinder and said vehicle brakes in each of said two brake circuits, each of said isolation valves being switched into a closed position when said vehicle brakes are supplied with fluid from said normal hydraulic energy source, and wherein at least the electrically controllable brake valve devices are controlled by a control unit; and*

*a respective one of said fluid separator unit and a second fluid separator unit being interposed between each of said first and second vehicle brakes of said first vehicle axle and an associated one of the electrically controllable brake valve devices, said first and second vehicle brakes being connected to a respective one of said isolation valves associated with said two brake circuits of said master cylinder.*

*36. The brake system of claim 1, further comprising:*

*a second vehicle brake, each of said vehicle brake and said second vehicle brake comprising respective wheel brakes for two wheels, in which the wheels are distributed at each end of a front vehicle axle;*

*a hydraulic fluid reservoir;*

*said normal source of pressurized hydraulic brake fluid having a motor-driven pump for pumping hydraulic brake fluid from said reservoir;*

*a brake pedal;*

*said backup source of pressurized hydraulic fluid comprising a master cylinder supplying two brake circuits, said master cylinder being actuated by said brake pedal and being intended for carrying out a backup brake operation by muscle-powered energy via said brake pedal, each of said brake circuits being in fluid communication with a respective one of said wheel brakes; and*

*a respective electrically controllable brake valve device associated with each of said wheel brakes, said electrically controllable brake valve devices being arranged to block a respective flow path from said normal source to said wheel brakes and to open a respective flow path from said wheel brakes to said reservoir when no braking is being demanded.*

* * * * *